US011777635B2

(12) United States Patent
ten Have

(10) Patent No.: US 11,777,635 B2
(45) Date of Patent: Oct. 3, 2023

(54) DIFFRACTION COMPENSATED COMPACT WAVELENGTH DIVISION MULTIPLEXING DEVICES

(71) Applicant: CORNING RESEARCH & DEVELOPMENT CORPORATION, Corning, NY (US)

(72) Inventor: Eric Stephan ten Have, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/523,225

(22) Filed: Nov. 10, 2021

(65) Prior Publication Data

US 2023/0063431 A1 Mar. 2, 2023

Related U.S. Application Data

(60) Provisional application No. 63/238,990, filed on Aug. 31, 2021.

(51) Int. Cl.
*H04J 14/02* (2006.01)
*G02B 6/293* (2006.01)
(Continued)

(52) U.S. Cl.
CPC ........ *H04J 14/0216* (2013.01); *G02B 6/2938* (2013.01); *G02B 6/29362* (2013.01);
(Continued)

(58) Field of Classification Search
CPC ... H04J 14/02; G02B 6/29362; G02B 6/2938; G02B 27/30; H04B 10/25; H04B 10/40; H04B 10/66
See application file for complete search history.

(56) References Cited

U.S. PATENT DOCUMENTS 5,592,326 A * 1/1997 Taira .......................... G02F 1/39
359/326
7,843,644 B1 11/2010 Wang et al.
(Continued)

FOREIGN PATENT DOCUMENTS

CN 110431772 A 11/2019
CN 209858779 U 12/2019

OTHER PUBLICATIONS

European Patent Application No. 22193265.0, Extended European Search Report dated Jan. 19, 2023; 6 pages European Patent Office.
(Continued)

*Primary Examiner* — Pranesh K Barua
(74) *Attorney, Agent, or Firm* — Tamika A. Crawl-Bey

(57) ABSTRACT

A wavelength division multiplexing device includes a common port and a plurality of filters that define an optical path. The common port includes a collimator that transmits an optical beam including a plurality of optical signals. Each optical signal is associated with a different wavelength range, and each filter includes an interface having a radius of curvature. One filter is configured to receive the optical beam from the collimator, transmit an optical signal through its interface, and reflect the remaining portion of the optical beam toward another filter. The common collimator and filter are configured so that the reflected portion of the optical beam has a beam waist located in the optical path midway between the filters, and a wavefront radius of curvature at the other filter that matches the filter radius of curvature of that filter. A method of processing light in such a device is also disclosed.

11 Claims, 18 Drawing Sheets

(51) Int. Cl.
*H04B 10/25* (2013.01)
*H04B 10/40* (2013.01)
*H04B 10/66* (2013.01)

(52) U.S. Cl.
CPC ............ *H04B 10/25* (2013.01); *H04B 10/40* (2013.01); *H04B 10/66* (2013.01)

(56) References Cited

U.S. PATENT DOCUMENTS

| | | | |
|---|---|---|---|
| 9,551,833 B1 | 1/2017 | Li et al. | |
| 10,281,654 B2 | 5/2019 | Xuefeng | |
| 10,371,897 B2 | 8/2019 | Xuefeng | |
| 2002/0057868 A1 | 5/2002 | Wu et al. | |
| 2003/0002787 A1* | 1/2003 | Honda | G02B 6/32 385/24 |
| 2010/0027569 A1* | 2/2010 | Brekke | G02B 6/262 372/50.23 |
| 2019/0267769 A1* | 8/2019 | Katsuragawa | H01S 3/08045 |
| 2023/0010259 A1* | 1/2023 | Tanaka | G02B 6/29365 |

OTHER PUBLICATIONS

Honda et al., "Diffraction-compensated free-space WDM add-drop module with thin-film filters", in IEEE Photonics Technology Letters, vol. 15, No. 1, 2003, pp. 69-71.

\* cited by examiner

DIFFRACTION COMPENSATED COMPACT WAVELENGTH DIVISION MULTIPLEXING DEVICES

PRIORITY APPLICATION

This application claims the benefit of priority of U.S. Provisional Application No. 63/238,990, filed on Aug. 31, 2021, the content of which is relied upon and incorporated herein by reference in its entirety.

BACKGROUND

Optical fibers are useful in a wide variety of applications, including the telecommunications industry for voice, video, and data transmissions. Benefits of optical fibers include wide bandwidth and low noise operation. However, the need to connect network nodes with fiber-optic cables often drives the cost of fiber-optic networks, especially for fiber-optic networks having a large geographic footprint.

One way to increase the capacity of existing fiber-optic networks while avoiding the need to lay additional fiber-optic cables is through Wavelength Division Multiplexing (WDM). WDM involves transmitting data with multiple optical signals in a single optical fiber. Each optical signal has a different wavelength from the other optical signals. The single optical fiber transmits the different optical signals simultaneously in the same direction. Thus, the different optical signals provide different channels for data in the single optical fiber, and may be referred to as "signal components" or "optical carriers" of a combined optical signal or "optical beam" carried by the optical fiber. Because of their cost-effectiveness, WDM applications are increasingly being deployed to address the increasing demand for bandwidth.

WDM systems require hardware to combine and separate the different optical signals at different locations in an optical network. Typically, this hardware includes a WDM device (referred to as a multiplexer) that combines the individual optical signals into the optical beam at one network location, and another WDM device (referred to as a demultiplexer) that splits the optical beam into the individual optical signals at another network location. WDM devices are often deployed in tightly confined spaces. Thus, it is desirable for the multiplexing hardware be as compact as possible.

FIG. 1 depicts an exemplary WDM device 10 that uses a plurality of bandpass filters 12 to define an optical path for an optical beam 44 that includes different optical signals 14 (i.e., n optical signals at different wavelengths $\lambda_n$). The WDM device 10 further includes a common port 18, a plurality of channel ports 19-26, an optional upgrade port 27, and a plurality of collimators 38. Each port 18-27 is configured to receive or includes an optical fiber 40-42. The optical fiber 40 associated with the common port 18 carries the optical beam 44 and may be referred to as a "common optical fiber". The optical fibers 41 associated with the channel ports 19-26 each carry one of the optical signals 14 and may be referred to as a "channel optical fiber". The optical fiber 42 associated with the upgrade port 27 carries one or more optical signals 14 not associated with any of the channel ports 19-26.

More specifically, each filter 12 has a passband that passes a range of wavelengths that includes the wavelength $\lambda_n$ of a respective one of the optical signals 14, and excludes the wavelengths $\lambda_n$ of the other optical signals 14. Each filter 12 transmits the optical signal 14 having the wavelength $\lambda_n$ that falls within its passband, and reflects the optical signals 14 having wavelengths $\lambda_n$ that fall outside its passband. By arranging the filters 12 sequentially in the optical path, each filter 12 can: (a) separate one of the optical signals 14 from the optical beam 44 and provide the separated optical signal 14 to a respective collimator 38 (demultiplexing application); and/or (b) add one of the optical signals 14 from the respective collimator 38 to the optical beam 44 (multiplexing application). Thus, WDM devices that use filters are typically bi-directional, meaning that they can both split optical signals received from an optical fiber for distribution at the network location, and combine optical signals for transmission into the optical fiber at the network location. Thus, WDM devices can be used as a multiplexer, demultiplexer, or both a multiplexer and demultiplexer.

The dimensions of the WDM device 10 are largely determined by the lateral distance $d_1$ between adjacent filters 12 and the angle of incidence $\theta_i$ of the optical beam 44 on the filters 12. Together, these values define the transverse distance $d_2$ between opposing filters 12 according to the principles of trigonometry. Thus, the width of the WDM device 10 is primarily determined by the design choices that set the lateral distance $d_1$. The lateral distance $d_1$ is determined by the size of the components and the space required to assemble the WDM device 10, with a typical lateral distance di being about 2.5 mm. The length of the WDM device 10 is largely determined by the transverse distance $d_2$, which is dependent on the angle of incidence $\theta_i$. The angle of incidence $\theta_i$ is determined by the layer stack of the filters 12. Typical angles of incidence $\theta_i$ are 1.8° and 4° for Dense Wavelength Division Multiplexing (DWDM) applications and 13.5° for Coarse Wavelength Division Multiplexing (CWDM) applications. In any case, more stringent optical requirements typically drive WDM device design toward a lower angle of incidence $\theta_i$. A lower angle of incidence $\theta_i$ facilitates design of a filter 12 that provide a sufficiently narrow passband. A larger angle of incidence $\theta_i$ may result in a lower overall length of the WDM device 10, but may also result in higher complexity and cost for filters 12 with sufficient optical performance.

A WDM device having an angle of incidence $\theta_i$=1.8 degrees and filters 12 having a width of 1.5 mm requires a transverse distance $d_2$ of about 40 mm to allow for sufficient spacing between adjacent filters 12. Using these design parameters for the depicted eight channel WDM device 10, the total propagation length (optical signal path) from the common port 18 to the last channel port 26 would be about 320 mm. Diffraction over this propagation length typically results in a significant increase in the width of the optical beam 44. This increase in beam width may make it difficult to fully couple the optical signals 14 into the optical fibers 40-42. Poor coupling of the optical signals 14 into the optical fibers 40-42 may in turn lead to excessive insertion loss.

Thus, there is a need in the fiber optics industry for improved methods of controlling beam width and reducing insertion loss in WDM devices.

SUMMARY

A wavelength division multiplexing (WDM) device includes a common port and a plurality of filters that define an optical path for the optical beam. The common port includes a common collimator configured to transmit an optical beam that includes a plurality of optical signals. Each optical signal of the plurality of optical signals is associated with a different wavelength range, and each filter of the plurality of filters includes an interface having a filter radius of curvature. A first filter of the plurality of filters is configured to receive the optical beam, transmit one of the plurality of optical signals through the interface, and reflect a remaining portion of the optical beam from the interface toward a second filter of the plurality of filters. The common collimator and the first filter are configured so that the remaining portion of the optical beam reflected by the first filter has a beam waist located in the optical path midway between the first filter and the second filter, and a wavefront radius of curvature at the second filter that matches the filter radius of curvature of the second filter.

In one embodiment, the interface of each filter of the plurality of filters may include a concave side, and the filter may be oriented so that the concave side faces the optical path.

In one embodiment, the WDM device may include a plurality of channel ports, and each channel port may be associated with a respective filter of the plurality of filters and include a respective channel collimator.

In one embodiment, the common collimator and each channel collimator of the plurality of channel collimators may include a respective collimating lens, and each collimating lens may have the same focal length.

In one embodiment, each channel port of the plurality of channel ports may include an optical fiber having an end face and a mode field diameter, and each channel collimator of the plurality of channel ports may include a respective collimating lens. The collimating lens may be configured to receive the optical signal transmitted by the respective filter, and transmit the optical signal to the optical fiber so that the beam waist of the optical signal provided to the optical fiber is located at the end face of the optical fiber and has a waist diameter that is matched to the mode field diameter.

In one embodiment, the optical beam may include at least four different optical signals each associated with a respective wavelength range, and the plurality of filters may include at least four filters. Each of the at least four filters may be configured to transmit one of the at least four different optical signals through the interface of the filter and reflect from the interface any other of the at least four different optical signals as the remaining portion of the optical beam.

In one embodiment, the first filter may be spaced from the second filter by a filter separation optical distance measured along the optical path, the common collimator may have a working distance equal to zero, and the common collimator may be located in the optical path at a common collimator optical distance from the first filter that is equal to half the filter separation optical distance.

In one embodiment, the first filter may be spaced from the second filter by the filter separation optical distance measured along the optical path, the common collimator may have a working distance equal to half the filter separation optical distance, and the common collimator may be located in the optical path at a common collimator optical distance from the first filter that is equal to the filter separation optical distance.

A method of processing light in the WDM device includes transmitting, by the common collimator of the common port, the optical beam including the plurality of optical signals, and receiving the optical beam at the first filter of the plurality of filters. Each optical signal of the plurality of optical signals is associated with a different wavelength range, the plurality of filters defines the optical path for the optical beam, and each filter of the plurality of filters includes an interface having the filter radius of curvature.

The method further includes transmitting one of the plurality of optical signals through the interface of the first filter, and reflecting the remaining portion of the optical beam from the interface of the first filter toward the second filter of the plurality of filters. The common collimator and the first filter are configured so that the remaining portion of the optical beam reflected by the first filter has a beam waist located in the optical path midway between the first filter and the second filter, and the wavefront radius of curvature at the second filter that matches the filter radius of curvature of the second filter.

In one embodiment, reflecting the remaining portion of the optical beam from the interface of the first filter toward the second filter of the plurality of filters may include focusing the remaining portion of the optical beam by an amount sufficient to locate the beam waist in the optical path midway between the first filter and the second filter.

In one embodiment, the method may further include receiving, by each channel collimator, the optical signal transmitted through the interface of the filter associated with the respective channel port, and focusing, by each channel collimator, the received optical signal by the amount sufficient to locate the beam waist at the end face of the optical fiber and so that the beam waist has the waist diameter matched to the mode field diameter.

In one embodiment, each channel collimator may apply the same amount of focusing to the received optical signal.

In one embodiment, the method may further include transmitting, by each of the at least four filters, the respective one of the at least four different optical signals through the interface of the respective filter, and reflecting, by each of the at least four filters, any of the at least four different optical signals other than the transmitted optical signal as the remaining portion of the optical beam.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to wavelength division multiplexing (WDM) devices that employ a plurality of bandpass filters to: (a) separate multiple optical signals simultaneously carried by a single optical fiber, and/or (b) combine multiple optical signals to be simultaneously carried by a single optical fiber. Each of the bandpass filters includes an interface that transmits optical signals within a wavelength range, reflects optical signals outside the wavelength range, and has a radius of curvature. Beam divergence consistency at channel ports of the WDM devices is improved by adjusting the waist radius of a beam that is multiplexed or demultiplexed by the WDM device so that the wavefront curvature of the beam at a given filter matches the curvature of that filter.

As is described in detail below, beam waist engineering is used to control a number of conditions that contribute to consistent beam characteristics at each port of a WDM device. These conditions include: (1) setting a working distance of a collimator of the common port that allows optimum coupling of all signal channels for a set distance between filters, (2) accommodating the effect of filter curvature on the beam width at each channel port without regard to the number of filters in the optical signal path between the channel port and the common port, and (3) providing a collimated beam at each optical fiber end face associated with a channel port.

The above conditions imply that the characteristics of the beam received at each channel port should be independent of channel number, which further implies that each channel port may use a collimator with the same specifications, e.g., the same focal length and lens-to-fiber distance.

Figure 2:
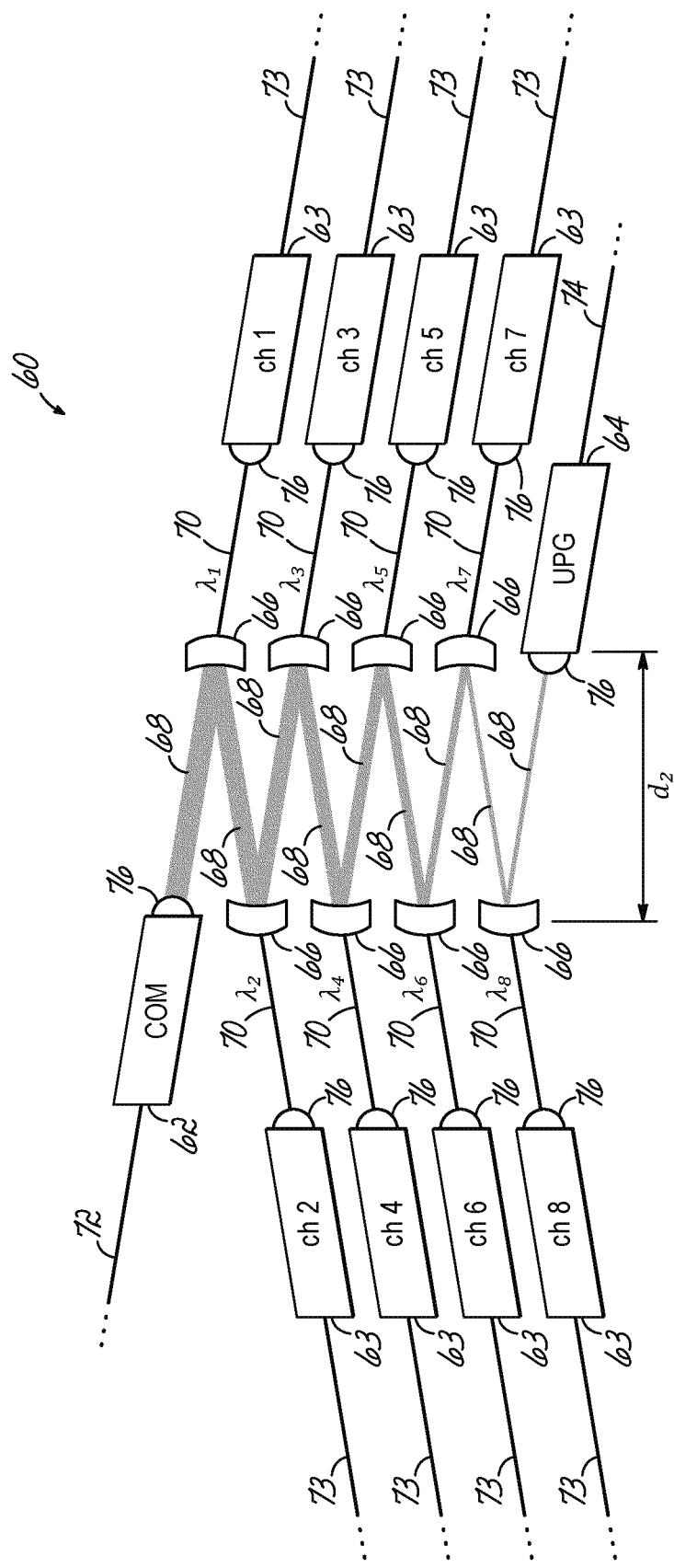
FIG. 2 is a schematic view of another exemplary multiplexer including a different arrangement of bandpass filters.

FIG. 2 depicts an exemplary WDM device 60 that includes a common port 62, a plurality of channel ports 63, an upgrade port 64, and a plurality of bandpass filters 66. The filters 66 are arranged to sequentially receive an optical beam 68 (e.g., a Gaussian beam) comprising one or more optical signals 70. Each port 62-64 is configured to receive an optical fiber 72-74, and includes a collimator 76 configured to optically couple a respective optical signal 70 to and from (i.e., between) the optical fiber 72-74 and its respective filter 66. Each filter 66 is configured to transmit an optical signal 70 having a wavelength $\lambda_n$ within the range of wavelengths covered by the passband of the filter 66, and reflect optical signals 70 having wavelengths $\lambda_n$ outside the range of wavelengths covered by the passband of the filter 66.

Each filter 66 separates out or adds an optical signal 70 to the optical beam 68 depending on the direction in which the optical signal 70 is travelling. Thus, the WDM device 60 can be used bi-directionally to both separate optical signals 70 received from the optical fiber 72 at the common port 62, and to combine optical signals 70 received from channel ports 63 for transmission into the optical fiber 72 connected to the common port 62.

The total insertion loss experienced by each optical signal 70 may be determined by a number of factors. These factors may include, but are not limited to, the transmission loss of the filters 66, the quality of the surfaces of the filters 66 (e.g., with rough surfaces causing additional absorption or scattering), the number of preceding reflections and associated losses for each reflection, the size and position of the optical beam 68 at each filter, and how well the optical signals 70 are coupled into each receiving optical fiber 72 by its respective collimator 76.

At least some of the above factors can be tuned by the optical design of the WDM device 60 to optimize performance. Tunable factors may include the beam width and divergence of the optical beam 68 at each filter 66, and how the optical signal 70 is coupled into the receiving optical fiber 72 by the collimator 76. Methods for tuning the above factors may include adjusting the focal length and working distance of the collimator 76 of common port 62, adjusting the focal length and working distance of the collimators 76 at each of the channel ports 63, and adjusting distances between optical components in the optical path.

Figure 3:
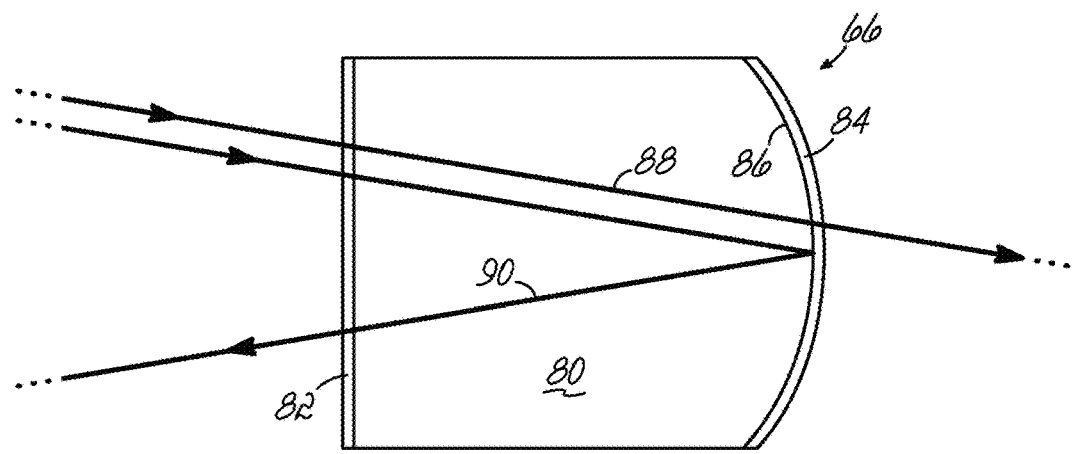
FIG. 3 is a schematic view showing additional details of one of the bandpass filters of FIG. 2.

Referring now to FIG. 3, each filter 66 may include an optically transparent substrate 80, an anti-reflective coating 82 applied to one side of the substrate 80, and a filter coating 84 applied to the opposite side of the substrate 80. The filter coating 84 may include a plurality of thin layers of dielectric material (not shown), typically referred to as a layer stack.

Each layer in the layer stack has a thicknesses and refractive index selected so that filter coating 84 transmits each optical signal 88 associated with a wavelength range in the passband of the filter 66, and reflects each optical signal 90 associated with a wavelength range outside the passband of the filter 66. Thus, the optical performance of the filter 66 is determined, at least in part, by the design of the layer stack.

Generally, layer stacks include up to several dozen layers of alternating materials with different refractive indexes. The optical characteristics are determined by the interplay of the refractive index differences and the thicknesses of the layers. Due of stresses between the substrate 80 and the layer stack of filter coating 84, the interface 86 between the substrate 80 and the filter coating 84 typically has a curvature, referred to herein as the filter interface curvature. The filter interface curvature may have an effect on the reflected optical signals 90 that can be approximated using an optical model with a spherical or approximately spherical curvature. Advantageously, based on these curvature models, it has been determined that certain design parameters of the WDM device 60 may be optimized to work with the filter interface curvature to control the characteristics of optical beam 68. The anti-reflective coating 82 applied to the substrate 80 may cause that face to also have a slight curvature. However, this curvature is normally less than the curvature of interface 86.

Figure 4:
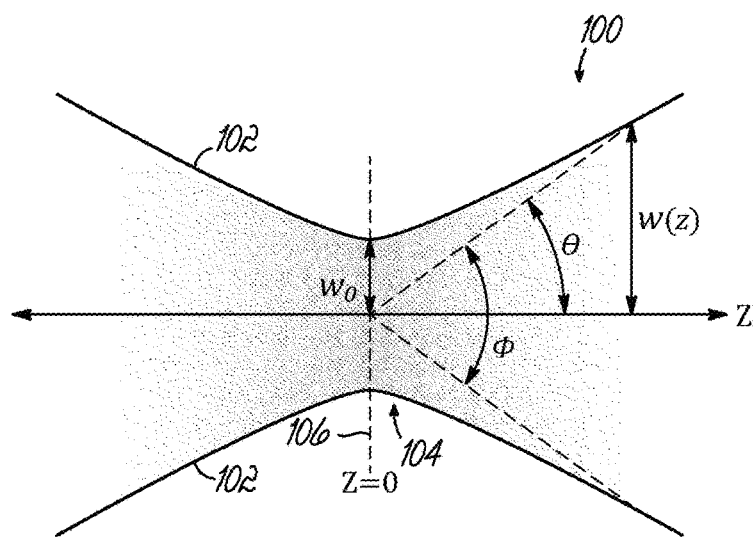
FIG. 4 is a diagrammatic view of a Gaussian beam including a waist.

FIG. 4 depicts a cross-sectional view of a Gaussian beam 100 having a beam axis (or "z-axis") along which the width of the Gaussian beam 100 varies. An outer surface 102 of the Gaussian beam 100 may be defined as the point at which the intensity of the Gaussian beam 100 has dropped to $1/e^2$ of its on-axis value. The narrowest point of the Gaussian beam 100 is referred to as the beam waist 104. The beam waist 104 is coincident with the location of the focal plane 106 (e.g., z=0) of the Gaussian beam 100. The radius w(z) of the Gaussian beam 100 increases with distance from the beam waist 104 according to the following hyperbolic expression:

$$w(z) = w_0 \sqrt{1 + \left(\frac{z}{z_R}\right)^2} \qquad \text{Eqn. 1}$$

where $w_0$ is the radius of the Gaussian beam 100 at z=0, and $z_R$ is a parameter known as the "Raleigh range".

The Raleigh range is provided by:

$$z_R = \frac{\pi \times n}{\lambda} \times w_0^2 \qquad \text{Eqn. 2}$$

where $\lambda$ is the free-space wavelength of the light comprising the Gaussian beam 100, and n is the index of refraction of the medium through which the Gaussian beam 100 is propagating, e.g., n=1 for free space propagation. The characteristics of the Gaussian beam 100 for a given wavelength $\lambda$ and optical medium can be completely defined by the waist radius $w_0$ since all the other characteristics of the Gaussian beam 100 are related to the waist radius $w_0$.

The increasing width of the Gaussian beam 100 with increasing distance from the beam waist 104 is known as beam divergence. Beam divergence can lead to insertion losses if the Gaussian beam 100 becomes too large. This type of insertion loss may be due to the outer portion of the beam not being captured at the end face of the optical fiber. For $z >> z_R$, the value of w(z) increases linearly with z. Thus, the Gaussian beam 100 becomes cone-shaped at large distances from the beam waist 104. The asymptotic beam divergence θ of the Gaussian beam 100 in this far-field region is provided by:

$$\theta = \frac{\lambda}{\pi \times n \times w_0} \qquad \text{Eqn. 3}$$

The total angular spread of the of the diverging Gaussian beam 100, or "apex angle" Φ is twice the divergence θ, as shown below:

$$\Phi = 2 \times \theta \qquad \text{Eqn. 4}$$

To avoid an excessively large WDM device, the distances between components in the WDM device are typically short enough that the divergence θ(z) within the WDM device deviates significantly from the asymptotic beam divergence θ. In these regions, divergence must be calculated from the slope of the beam radius function w(z). A function $\dot{w}(z)$ that provides the slope of the outer surface 102 of Gaussian beam 100 as a function of z can be derived by differentiating the beam radius function w(z) of Equation 1. The result of this differentiation can be simplified to:

$$\dot{w}(z) = w_0 \frac{z}{z_R \times \sqrt{z_R^2 + z^2}} \qquad \text{Eqn. 5}$$

The divergence θ(z) can then be determined by taking the arctangent of the slope function $\dot{w}(z)$:

$$\theta(z) = \tan^{-1}\left(w_0 \frac{z}{z_R \times \sqrt{z_R^2 + z^2}}\right) \qquad \text{Eqn. 6}$$

Figure 5:
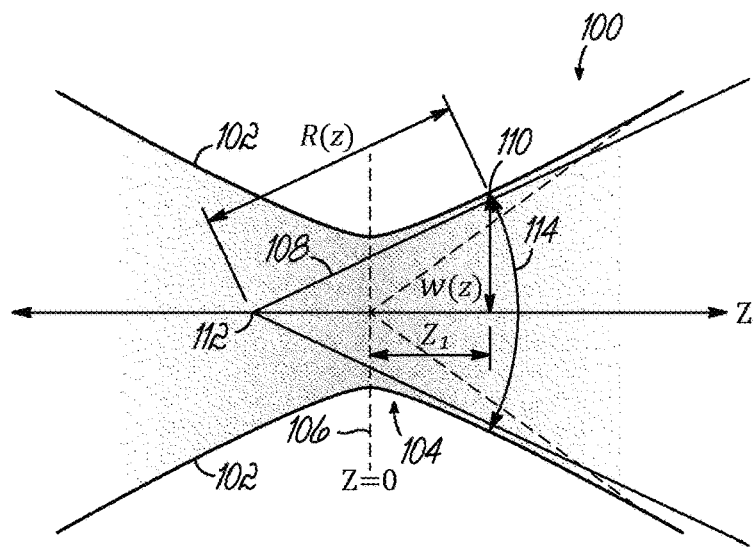
FIG. 5 is a diagrammatic view of the Gaussian beam of FIG. 4 showing a relationship between a divergence of the beam and a distance from the waist.

FIG. 5 depicts the slope of the outer surface 102 of Gaussian beam 100 at an exemplary point $z=z_1$. Tracing a tangent line 108 from the point 110 on the outer surface 102 corresponding to $z=z_1$ back to the z-axis identifies a center of radius 112 for a wavefront 114 of Gaussian beam 100 at $z=z_1$. Because the slope of the tangent line 108 depends on the slope of the outer surface 102, the curvature of the wavefront 114 varies with z. The wavefront curvature is flat (i.e., has zero curvature) at the beam waist (z=0), has its largest curvature at the Rayleigh range ($z=\pm z_R$), and flattens again as the distance from the beam waist increases past the Rayleigh range, approaching zero as z approaches infinity.

The wavefront curvature as a function of z is provided by:

$$\frac{1}{R(z)} = \frac{z}{z^2 + z_R^2} \qquad \text{Eqn. 7}$$

Wavefront curvature may be expressed in terms of its reciprocal, the radius of curvature R(z), which is provided by:

$$R(z) = z \times \left(1 + \left(\frac{z_R}{z}\right)^2\right) \qquad \text{Eqn. 8}$$

Figure 6:
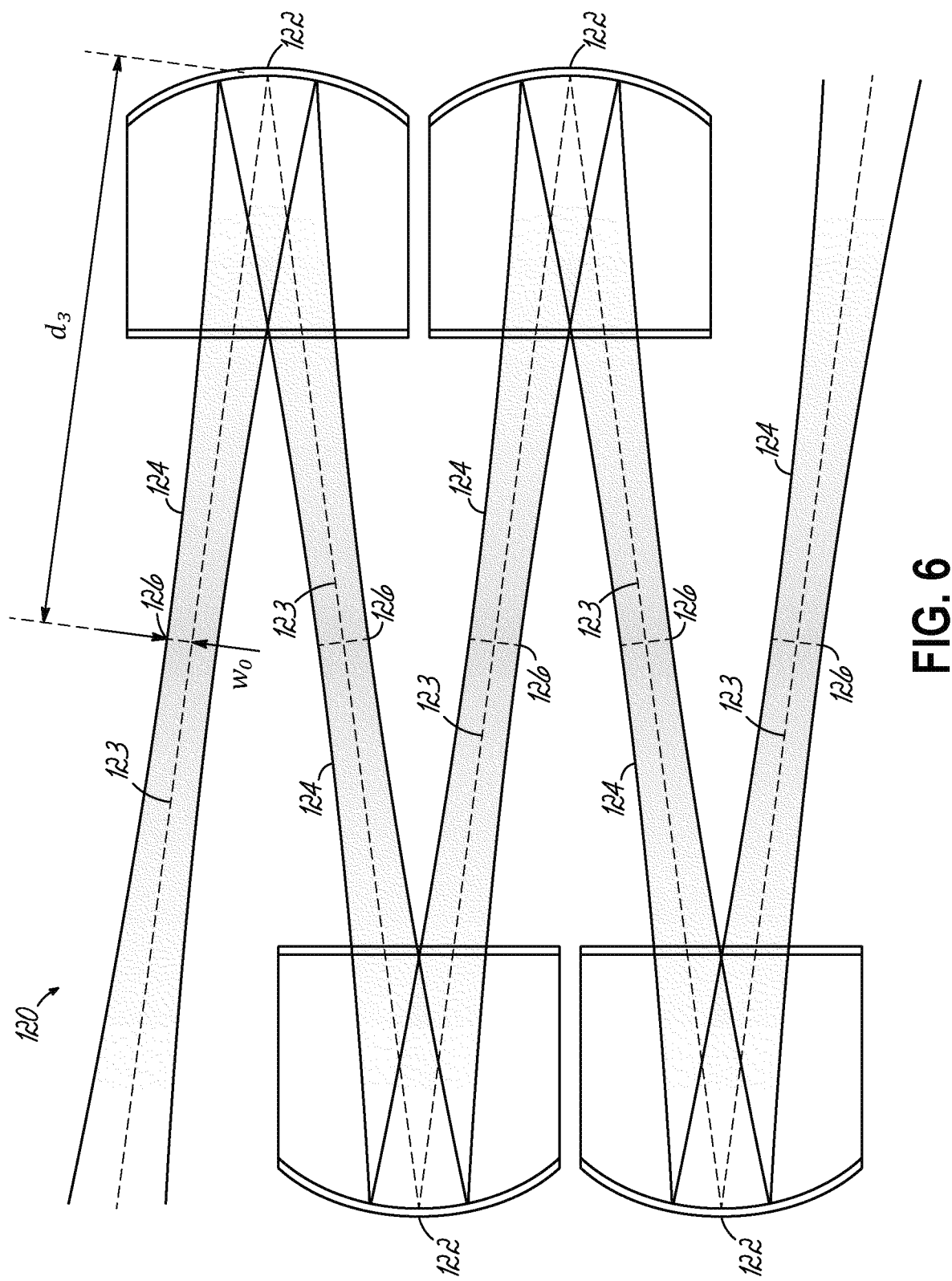
FIG. 6 is a diagrammatic view of the Gaussian beam of FIGS. 4 and 5 being reflected between a plurality of the bandpass filters of FIGS. 2 and 3.

FIG. 6 depicts a Gaussian beam 120 being reflected back and forth between a plurality of bandpass filters 122 that define an optical path 123 along which the Gaussian beam 120 propagates, e.g., as it passes through a WDM device.

Each segment 124 of beam 120 includes a beam waist 126 located a distance $d_3$ from the filters 122 at either end of the segment 124, such that the length of the optical path 123 between sequential filters 122, or the filter separation optical distance, is $2 \times d_3$. The interfaces of filters 122 may have generally equal radiuses of curvature $R_F$, and the filters 122 may be arranged so that each segment 124 of beam 120 is about the same length $L = 2 \times d_3$.

In order for the beam waists 126 to be located equidistant between the filters 122, the waist radius $w_0$ of the beam 120 may be selected so that the wavefront curvature of the beam 120 at $z = d_3$ matches the interface curvature of the filter 122. From Equation 8, it can be shown that a Gaussian beam having a wavefront with a radius of curvature $R(z)$ at a distance z from the beam waist will have a Raleigh range $z_R$ of:

$$z_R = z \times \left(\frac{R(z)}{z} - 1\right)^{\frac{1}{2}} \qquad \text{Eqn. 9}$$

Solving Equation 2 for the waist radius $w_0$ yields:

$$w_0 = \left(z_R \times \frac{\lambda}{\pi \times n}\right)^{\frac{1}{2}} \qquad \text{Eqn. 10}$$

Substituting Equation 9 into Equation 10, and setting $R(z) = R_F$ and $z = d_3$ yields:

$$w_0 = \left(d_3 \times \left(\frac{R_F}{d_3} - 1\right)^{\frac{1}{2}} \times \frac{\lambda}{\pi \times n}\right)^{\frac{1}{2}} \qquad \text{Eqn. 11}$$

Equation 11 provides a waist radius wo that produces a wavefront radius of curvature which matches the filter interface radius of curvature $R_F$ of the filters 122. Thus, Equation 11 may be used to determine a waist radius $w_0$ that provides an optimal match for a given distance $d_3$ and filter interface radius of curvature $R_F$ of the filters 122. By way of example, for a WDM device operating at a wavelength of 1540 nm, having filters with a filter interface radius of curvature $R_F = 1000$ mm, and a free-space optical path distance between sequential filters of 50 mm ($d_3 = 25$ mm), Equation 11 yields a waist radius $w_0$ of about 239 µm, or an optimal beam width at the beam waist of about 478 µm.

Figure 7:
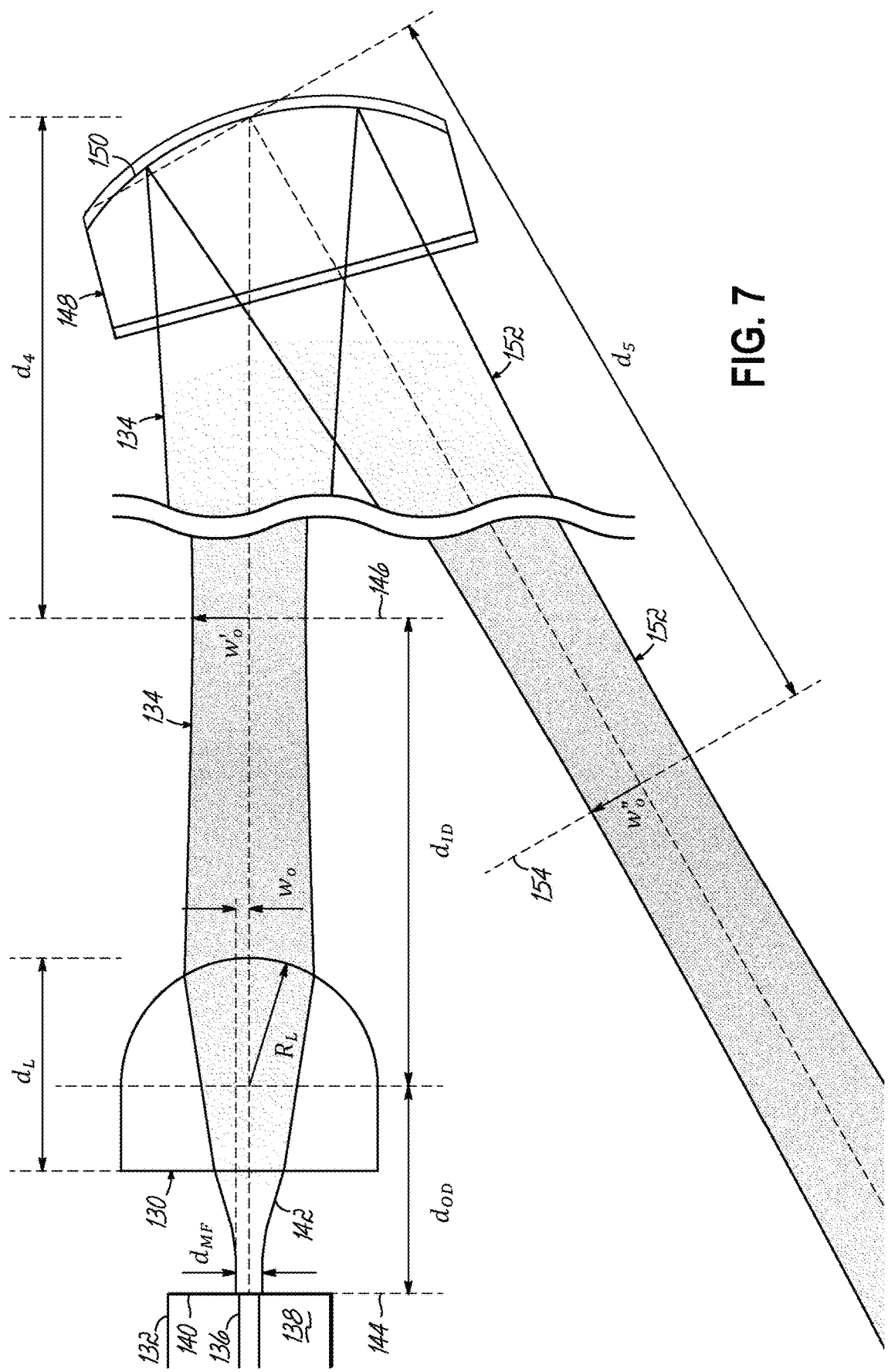
FIG. 7 is a diagrammatic view of a beam emitted by an optical fiber, passing through a collimating lens, and being reflected by a bandpass filter.

FIG. 7 depicts a collimating lens 130 that optically couples light between an optical fiber 132 and an optical beam 134 having properties characteristic of a free-space Gaussian beam. The optical fiber 132 includes a core 136 surrounded by a cladding 138, and an end face 140 from which an optical beam (e.g., an input optical beam 142) may be emitted, or at which an optical beam may be received. Light propagating through the optical fiber 132 is confined by the dielectric properties of the core 136 and cladding 138. When the input optical beam 142 emerges from the optical fiber 132, the light may no longer be confined. Thus, the input optical beam 142 may begin to diverge according to the laws of diffraction described above. It should be noted that the fiber-facing surface of collimating lens 130 may be angled relative to the face of optical fiber 132 (e.g., by eight degrees) to avoid a portion of the optical beam 142 from being reflected back into the optical fiber 132 from the planar face of the collimating lens 130. However, for simplicity, FIG. 7 depicts the planar face of collimating lens 130 and the face of optical fiber 132 as being parallel.

An input optical beam 142 emitted from a single mode fiber typically has a cross sectional intensity profile that is sufficiently similar to a Gaussian function to allow the input optical beam 142 to be treated as a Gaussian beam. Thus, the input optical beam 142 may be modeled as having a beam waist 144 located at the end face 140 with a waist radius $w_0$ equal to half the mode field diameter $d_{MF}$ of the optical fiber 132. Stated another way, the beam waist 144 should have a waist diameter $2 \times w_0$ that is matched to the mode field diameter $d_{MF}$ of the optical fiber 132 in both size and position. The mode field diameter $d_{MF}$ may be determined for the optical fiber 132 computationally, and can also be approximated by:

$$d_{MF} = 2a\left(0.65 + \frac{1.619}{\left(\frac{2\pi a}{\lambda} NA\right)^{3/2}} + \frac{2.879}{\left(\frac{2\pi a}{\lambda} NA\right)^6}\right) \qquad \text{Eqn. 12}$$

where a is the radius of the core 136, and NA is the numerical aperture of the optical fiber 132.

The cross-sectional profile of the light propagating through the optical fiber 132 typically extends into the cladding 138 such that the mode field diameter $d_{MF}$ is greater than the diameter of the core 136. The propagation model is generally bi-directional, so maximum coupling efficiency into the optical fiber 132 may be achieved by providing an axially-aligned incident Gaussian beam having a beam waist coincident with the end face 140 of optical fiber 132, and a waist diameter $2 \times w_0$ equal to the mode field diameter $d_{MF}$.

The collimating lens 130 may comprise a lens having a length $d_L$, a radius of curvature of $R_L$, and may be made from a material having a refractive index of $n_L$. These physical properties may collectively define a focal length $f_L$ of the lens. The collimating lens 130 may be located at an "object distance" $d_{OD}$ from the end face 140 of optical fiber 132 to receive the input optical beam 142. The waist radius $w_0$ of input optical beam 142, object distance $d_{OD}$, and focal length $f_L$ (not shown) of the lens 130 may cause the optical beam 134 to have a beam waist 146 at an "image distance" $d_{ID}$ from the collimating lens 130. As used herein, "working distance" $d_{WD}$ generally refers to the distance at which two collimators with the same working distance need to be positioned for optimum coupling, which in an embodiment is twice the image distance $d_{ID}$ between the collimating lens and the beam waist on the output side of the collimator. "Object distance" generally refers to the distance between the collimating lens and the beam waist on the input side of the collimator. In cases where the collimating lens 130 is unable to focus the input optical beam 142, the working distance $d_{WD}$ may be negative, indicating the beam waist is located at a virtual focal plane on the input side of the collimating lens 130. Thus, referring to FIG. 2, optimal coupling of optical signals 70 into and out of optical fibers 72-74 may occur when the object distance $d_{OD}$ and the lens-to-fiber distance are equal, and the working distance is zero.

As the optical beam 134 propagates away from the collimating lens 130, the optical beam 134 may encounter a filter 148 at an optical distance $d_4$ from the beam waist 146 along an optical path of the device in question. The filter 148 may include a filter interface 150 that reflects a portion of the optical beam 134 (e.g., toward another filter) as a reflected optical beam 152. The curvature of the filter interface 150 may modify the characteristics of incident optical beam 134 in a manner analogous to a collimating lens, so that the reflected optical beam 152 has a beam waist 154 at an optical distance $d_5$ from the filter 148. Further extending the collimator analogy, optical distance $d_4$ may be thought of as an object distance, and optical distance $d_5$ may be thought of as an image distance from the filter 148 or filter interface 150.

The waist radius $w_0''$ of beam waist 154 and the optical distance $d_5$ may depend on the characteristics of the incident optical beam 134 at the filter interface 150 (e.g., wavefront radius of curvature $R(d_4)$ and/or beam radius $w(d_4)$), and the curvature of the filter interface 150. Thus, for an input optical beam 142 having a given waist radius $w_0$, and a filter 148 having a given filter interface radius of curvature, the size and location of the beam waist 154 of reflected optical beam 152 may be set through selection of one or more of the focal length $f_L$ of collimating lens 130, the object distance $d_{OD}$ between the collimating lens 130 and the end face 140 of optical fiber 132, and optical distance $d_4$ between the beam waist 146 and filter 148. It has been determined that an optical beam having a consistent divergence and beam radius at each of the channel ports in a multi-channel WDM device may be produced by selecting values for one or more of the aforementioned focal length $f_L$, object distance $d_{OD}$, and optical distance $d_4$ so that:

(a) the beam waist 154 of the reflected optical beam 152 is located midway between consecutive filters 148 in the optical path (e.g., so that $d_5$ equals half the optical distance between consecutive filters in the optical path),
and
(b) the radius wo of the beam waist 154 produces a wavefront radius of curvature $R(d_5)$ that matches the filter interface radius of curvature $R_F$ of the filters 148.

Advantageously, the consistent optical characteristics provided by the above design criteria may enable multi-channel WDM devices to have well collimated optical signals at each channel port using the same collimator design throughout the WDM device. These well collimated optical signals, in turn, may reduce insertion loss due to mismatches between the beam waist radius $w_0$ and the mode field diameter $d_{MF}$ of the channel optical fiber.

The above beam waist engineering principles may be applied to the WDM device 60 of FIG. 2 to provide an example of one solution to the above design criteria. In this example, the focal length $f_L$ and object distance $d_{OD}$ of the collimator 76 of common port 62 may be selected so that the beam waist formed between the collimator 76 and the channel one filter 66 has a waist radius $w_0'$ which provides a wavefront having a radius of curvature $R(z)$ that matches the radius of curvature $R_F$ of the filters 66 when the beam waist is located at a distance from the channel one filter 66 which is half of the length of the beam segments between optically adjacent filters 66. Further, the collimator 76 may be located within the WDM device 60 so that the beam waist formed between the channel one filter 66 and the collimator 76 is located the same distance from the channel one filter 66 as the beam waist of the optical beam 68 between the channel one filter 66 and the channel two filter 66, i.e., at half of the length of the beam segments between optically adjacent filters 66.

The waist radius $w_0'$ of the optical beam 134 as a function of the mode field diameter $d_{MF}$ may be provided by:

$$w_0' = \frac{d_{MF} \times f_L}{2 \times \sqrt{(f_L - d_{OD})^2 + z_R^2}} \qquad \text{Eqn. 13}$$

where $z_R$ is the Raleigh range of the input optical beam 142. One or both of the object distance $d_{OD}$ and focal length $f_L$ that produces the desired waist radius $w_0'$ of the optical beam 134 may be determined computationally, by using Equation 13, or by using another defined relationship between the waist radius $w_0'$ of optical beam 134 and the waist radius $w_0$ of input optical beam 142.

Design objectives for WDM devices include minimizing insertion loss across all channels for a given set of the spectral characteristics (e.g., channel wavelengths). Additional design objectives may include minimizing the footprint and volume of the module, and reducing the bill of materials for the module. The footprint and volume of the module may be minimized by minimizing the distance $d_2$ between the filters 66, which depends on the filter angle of incidence $\theta_i$ and minimum lateral spacing of the filters allowed by the assembly process. Once these design parameters have been determined, the waist radius $w_0$ of the optical beam 68 may be adjusted by selecting the focal length of the collimators 76 so that the resulting diffraction of the optical beam 68 at the filters 66 is compensated for by the focusing effect of the interface 86. This may produce a constant beam width and negligible cone angle at each filter 66, thereby minimizing beam mismatch and insertion loss at each channel port 63.

The advantages of WDM devices that adhere to the above described beam waist engineering design principles may include, but are not limited to, improved spectral characteristics, minimization of center wavelength shift, minimization of peak transmission reduction, minimization of bandwidth increase at the filters, improved insertion loss across all channels, and improved channel uniformity. These improvements may allow modules with 24 or more channels to have low insertion loss, a simplified bill of materials (e.g., due to use of only one type of collimator), a minimized module footprint, and increased channel density.

In general, because the above formulas are wavelength dependent, and each channel has a different wavelength, the waist cannot be located at precisely the optimum position for all wavelengths at the same time. However, the wavelength differences are typically small enough (e.g., smaller than the effects of component tolerances), so that a multiplexer device can be designed for a mean wavelength and show improved performance for all channels. The beams may also show different behavior in x- and y-direction due to a lack of symmetry between these directions, commonly referred to as an astigmatic beam. Astigmatic beams may result, for example, from the interface angles in the collimators and tilting of the filters to generate the zig-zag optical path. Thus, the beams are typically astigmatic, and the waist located at different positions for the x- and y-directions. However, the resulting effects on the performance of the multiplexing devices are typically small enough to ignore.

Experimental Data

To demonstrate the improvement in performance achievable using beam waist engineering, WDM device performance was simulated for a baseline WDM device having conventional design parameters, and for a test WDM device having design parameters that produce a consistent waist radius $w_0$ in each of the Gaussian beam segments between opposing filters.

Figure 8:
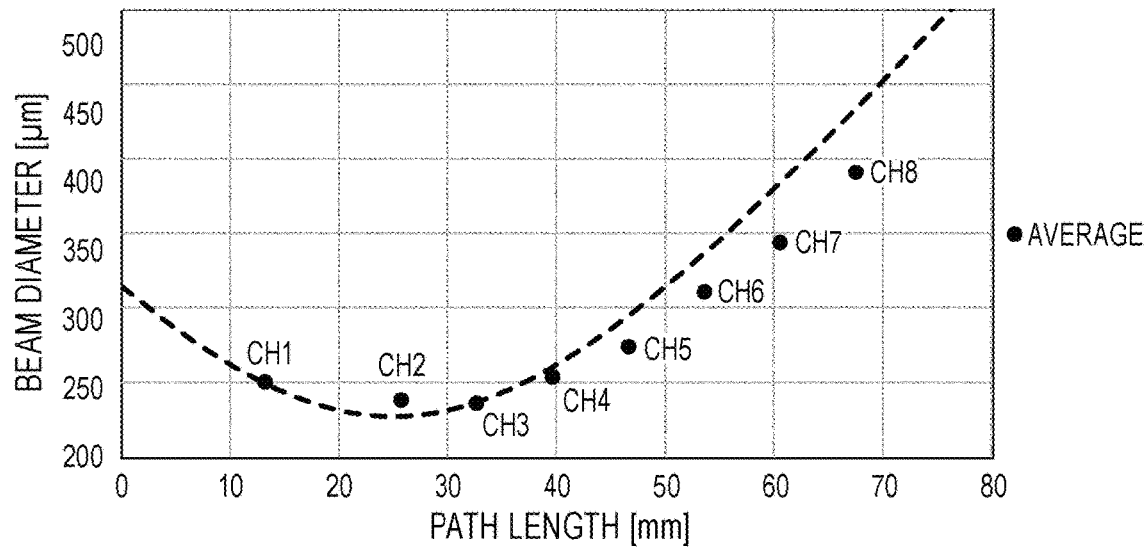
FIG. 8 is a graphical view of a scatter plot showing beam diameter versus path length for a Gaussian beam propagating through a baseline multiplexer.
Figure 9:
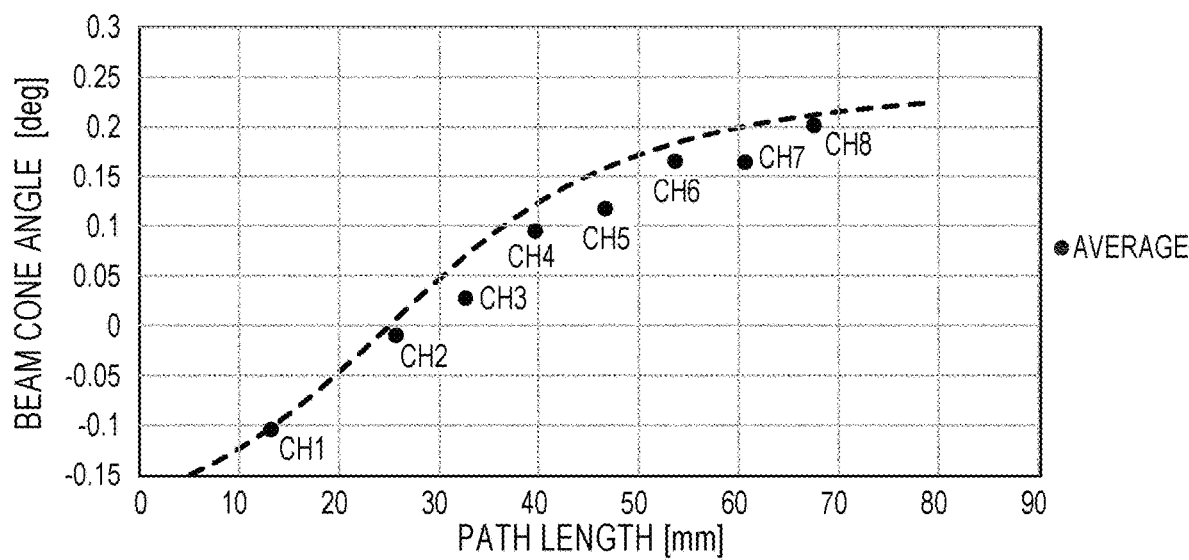
FIG. 9 is a graphical view of a scatter plot showing beam cone angle versus path length for the Gaussian beam propagating through the baseline multiplexer.
Figure 13:
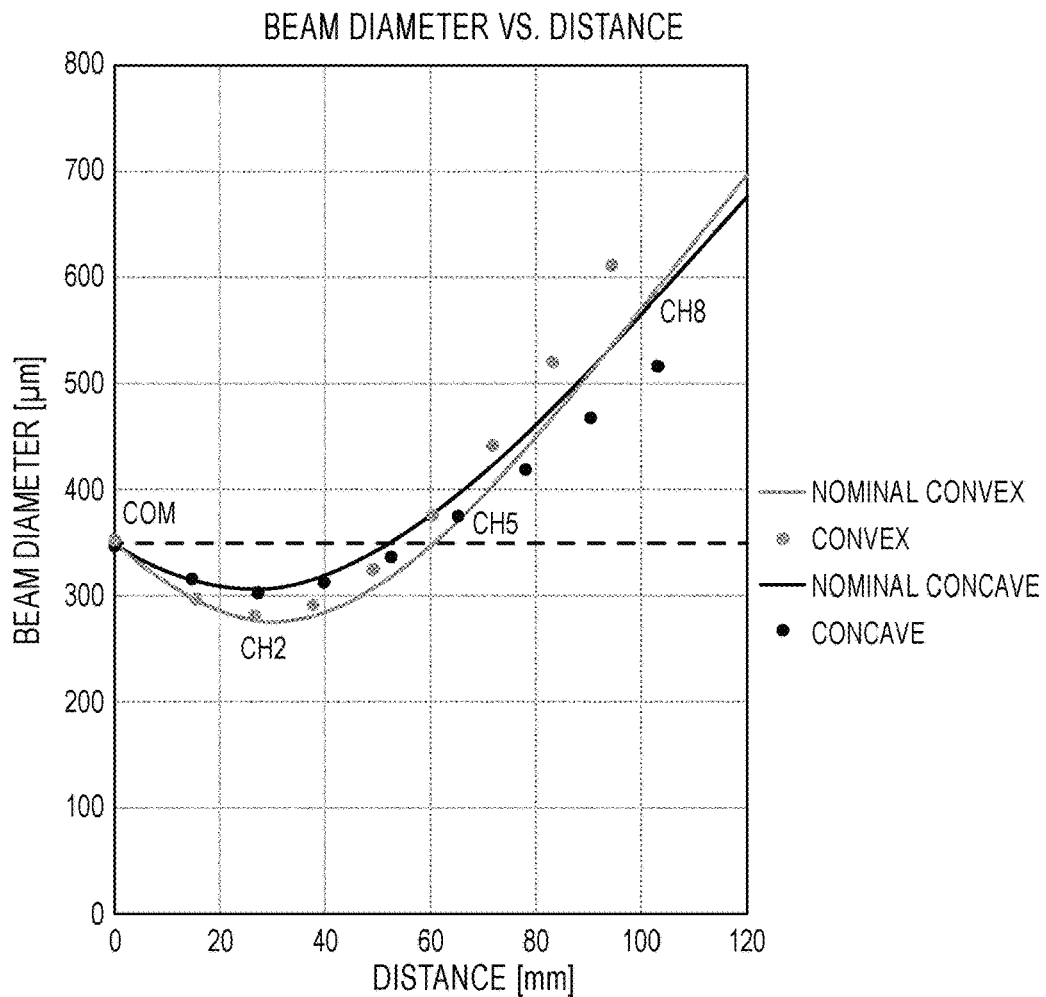
FIG. 13 is a graphical view of beam diameter versus distance for the baseline multiplexer with channel port collimator working distances individually optimized for each channel.
Figure 14:
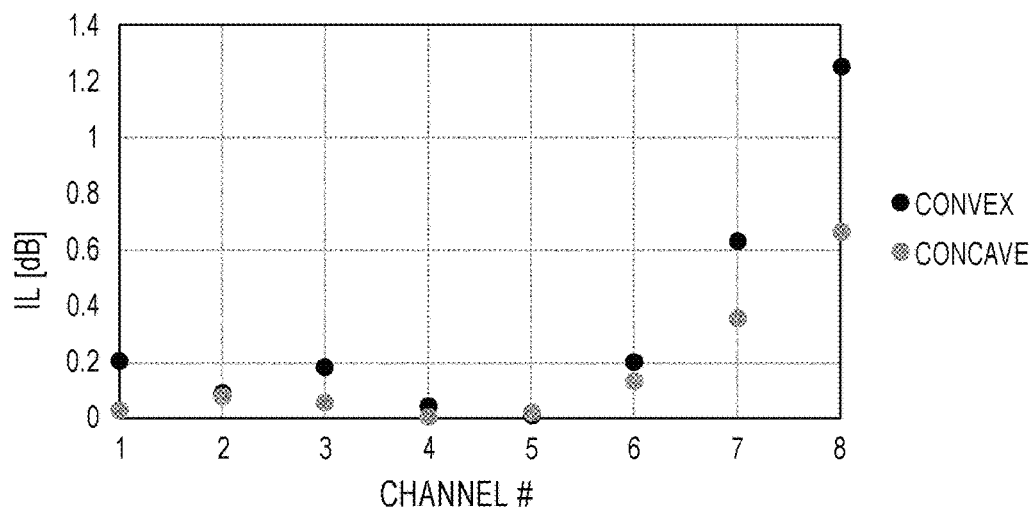
FIG. 14 is a graphical view showing optical path insertion loss resulting from the beam diameters of FIG. 13.

The baseline WDM device used to generate the data depicted by FIGS. 8 and 9 is based on an eight channel wavelength division multiplexing module including filters with a 13.5 degree angle of incidence $\theta_i$. The baseline WDM device used to generate the data depicted by FIGS. 13 and 14 is based on an eight channel wavelength division multiplexing module including filters with a 4 degree angle of incidence $\theta_i$. The design is further characterized by use of collimators having a standard focal length but with different working distances for different channels. All collimators used the same collimator lens, but the working distance was set for each port by adjusting the fiber-to-lens distance inside the collimator. Specifically, the working distances in the baseline WDM device were −20 mm for the channel one and two ports, 20 mm for the channel three and four ports, 30 mm for the channel five port, and 50 mm for all other ports (common and channel six through eight ports). Wavelengths used in the simulation were 1471 nm, 1491 nm, 1611 nm, 1511 nm, 1591 nm, 1531 nm, 1571 nm, and 1551 nm for channels one through eight, respectively. The filters were alternatingly positioned with anti-reflection and wavelength division multiplexing coatings oriented towards the incoming beam so that the beam was reflected off the concave side of the interface for odd channels, and the convex side of the interface for even channels.

Figure 10:
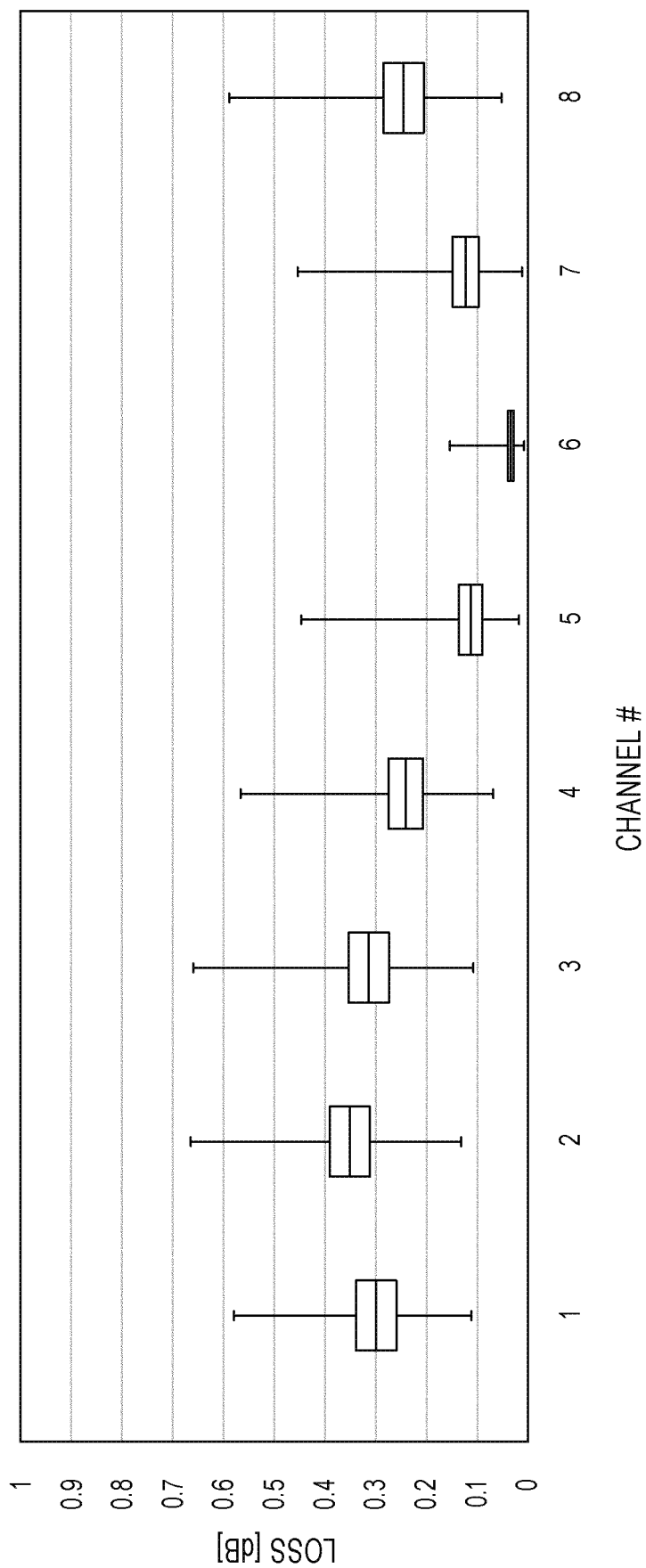
FIG. 10 is a graphical view of a box plot showing optical path loss versus channel for the baseline multiplexer.

The data in FIGS. 8-10 is based on Monte Carlo simulations of the baseline wavelength division multiplexing module using matrix formalism based on paraxial propagation theory for Gaussian beams. A total of 25,000 events were simulated using realistic assembly tolerances.

FIGS. 8 and 9 depict graphs of beam diameter (i.e., beam width) and cone angle, respectively. The beam diameters and cone angles may differ in the x- and y-directions due to the angle of incidence, which is only a factor in the x-direction. In contrast, the filter and beam are nominally perpendicular in the y-direction. However, for simplicity, the beam diameter and cone angles are only shown for each of the channels as an average of the x-direction and the y-direction. The dashed line shows the expected beam diameter and cone angle for an undisturbed beam, i.e., a beam that is not altered by the curved surfaces of the filters. As can be seen, alternating the orientation of the curved surface of the filters causes the simulated values for beam diameter and cone angle to remain close to that of the undisturbed beam.

FIG. 10 depicts a graph showing the optical path loss for each channel of the baseline WDM device. The optical path loss varies between different channels, with the highest loss for channel 2 (about 0.34 dB) and the lowest loss for channel 6 (about 0.03 dB). The simulated results presented by FIG. 10 presume the lateral alignment of the optical components of the collimators is perfect, and ignore losses from the filters (e.g., absorption, scattering, reflection) and the collimators due to misalignment. Thus, the data only reflects losses caused by the optical propagation of the beam through the module, and the effects of variations in working distances. Accordingly, the observed losses are caused by a mismatch of the desired and actual beam diameter and cone angle (beam wavefront radius of curvature) at the receiving collimators, as depicted by FIGS. 8 and 9.

The test WDM device includes collimator lenses having identical specifications and with a working distance of 0 mm at each port. The working distance for each collimator lens was set by adjusting the distance between the collimator lens and the end face of the optical fiber that transmits optical signals to/receives optical signals from the collimator lens. The filters were oriented with the concave side of the curve facing the Gaussian beams as depicted in FIG. 2. The transverse distance between opposing filters was minimized for a filter angle of incidence $\theta_i=4$ degrees and a lateral distance of 2.5 mm, which is the minimum distance required by the assembly process. This resulted in a transverse distance of about 18 mm.

The collimator lenses of the simulated baseline module each had a length of L=2.62 mm, a radius of curvature of $R_L=1.2$ mm, and a refractive index of n=1.7447 at $\lambda=1550$ nm. These physical parameters set the focal length at about f=1.61 mm. This focal length was determined to generate a Gaussian beam having a level of diffraction at the filters that was compensated for by the focusing effect of the concave filter surfaces using the principles of beam waist engineering described above. The collimator lenses of the simulated test module each had a length L=4.27 mm, a radius of curvature of $R_L=1.9$ mm, and focal length at about f=2.55 mm. These may be approximate values, and can vary when other parameters are changed.

Figure 11:
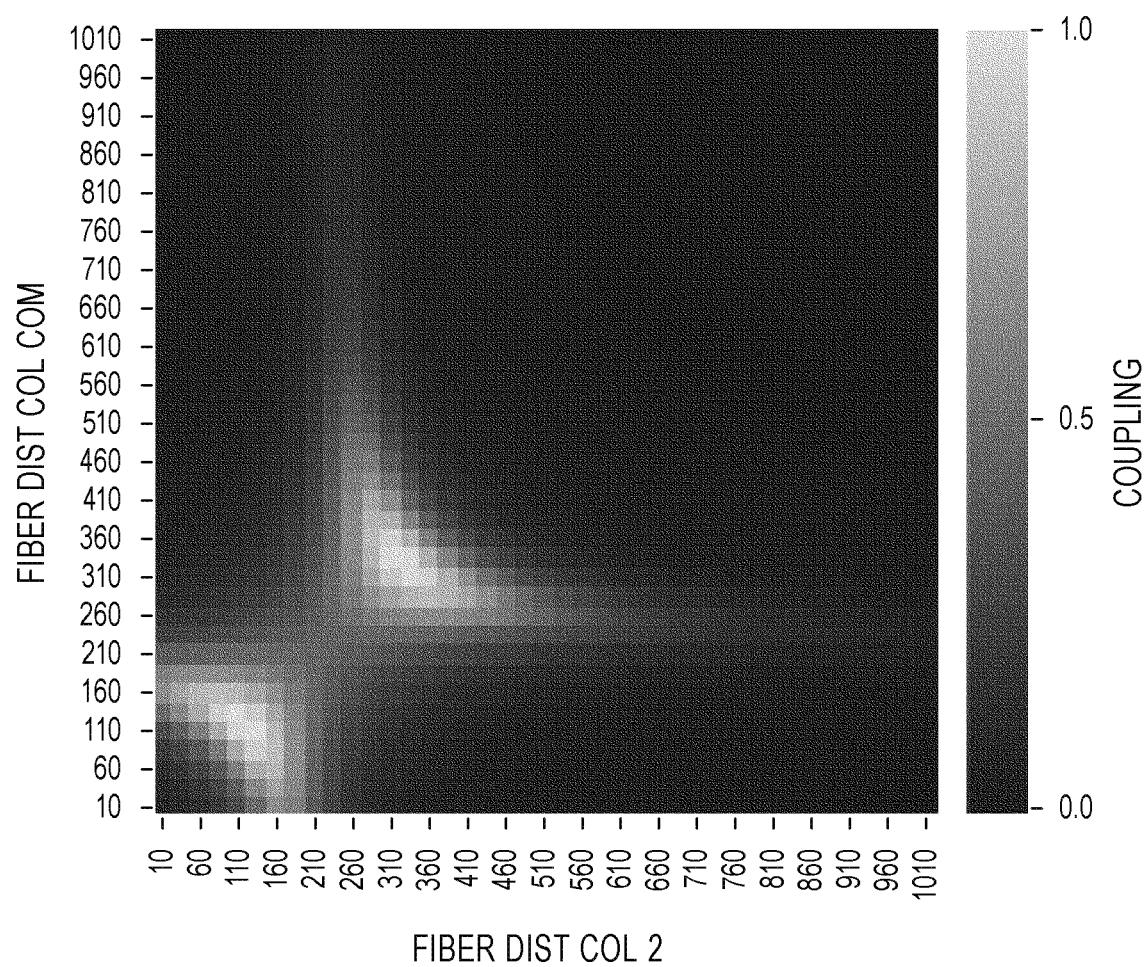
FIG. 11 is a graphical view of a heat map showing coupling efficiency for a channel of a test multiplexer versus fiber-to-collimator distances for a common port and a channel port of the test multiplexer.

Through optical simulations, the collimator working distance can be optimized for each channel. FIG. 11 depicts a heat map showing coupling efficiency for channel 2 of the test module as function of the collimator working distance in each of the common port (vertical axis) and the channel 2 port (horizontal axis). The working distance is adjusted by varying the fiber-to-lens distance. The map indicates two regions of good coupling. One is centered at a fiber-to-lens distances of about 110 μm for each of the common and channel 2 ports, and the other is centered at fiber-to-lens distances of about 325 μm for each of the common and channel 2 ports. These regions of good coupling occur where the working distance of the two collimators corresponds to the effective distance between the collimators (see FIG. 12).

Figure 12:
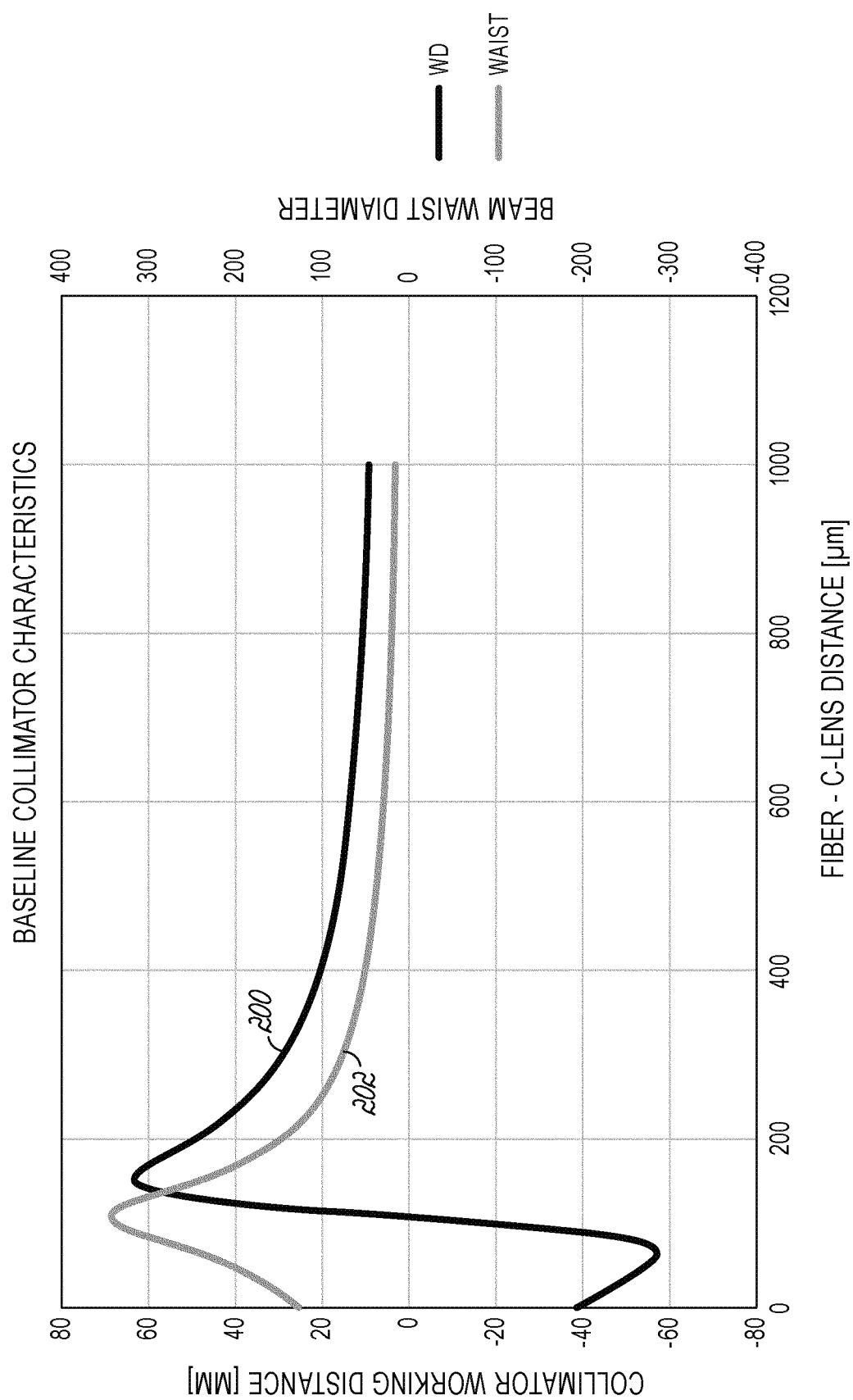
FIG. 12 is a graphical view of plots showing beam radius versus working distance and beam radius versus fiber-to-collimator distance for the baseline multiplexer.

FIG. 12 depicts a graph including a plot 200 depicting working distance as a function of object distance (e.g., the fiber-to-lens distance of the collimator), and a plot 202 depicting waist radius versus object distance. While the working distance is the same for the fiber-to-lens distances, the diameter of the beam at the beam waist position differs. This means that the waist is located at the same position in both cases, but that the beam waist diameter differs. In the simulation, the distance between the common port and channel 2 port is about 30 mm, so the fiber-to-lens distance of the collimator has to be about 120 or 290 μm as indicated by the points at which the working distance plot 200 intersects the 30 mm working distance line. However, the effective distance is modified by the effect of the curved filter surfaces, so that the actual distances are given by FIG. 11.

Due to the sequential arrangement of the filters, the distance from the common port to the filter is different for each channel. Consequently, the required working distance for each channel is also different. This means that using a single working distance for multiple channels leads to mismatched beams and increased losses. Furthermore, FIG. 12 shows that the optimum working distance for the common port collimator is different for each channel. Consequently, in conventional WDM devices, even if the working distance is optimized for each channel individually, coupling can only be optimized for one channel, e.g., channel 6 in FIG. 10.

FIG. 13 depicts simulated beam diameters for the baseline module with channel port collimator working distances individually optimized for each channel. One set of datapoints shows the diameter of the beam versus distance with the filters oriented so that the convex side of the interface reflects the Gaussian beam. Another set of datapoints shows the diameter of the beam versus distance with the filters oriented so that the concave side of the interface reflects the Gaussian beam. Corresponding plots show the nominal diameter of the beam with respect to distance for the convex and concave orientations, but without the effect of the curved surface on the beam width. Based on the positions of convex datapoints above the convex plot and the positions of the concave datapoints below the concave plot, it is apparent that—absent any additional corrective action—the convex orientation results in a larger beam width, and the concave orientation results in a smaller beam width.

FIG. 14 depicts the corresponding optical path insertion loss for the two models depicted in FIG. 13. Only one channel can be matched (channel five), and the insertion losses become prohibitively high for the longer path lengths. This is in contrast to FIG. 10, in which channel six is matched. FIG. 13 also shows that there are large variations in beam width and cone angle for different channels. These variations can be expected to result in different spectral characteristics for each channel. While the beam is almost collimated for the lower channels (channels 1 through 3), the spectral performance may deteriorate for the higher channels (channels 6 to 8) due to the larger cone angles at the filters.

The test module includes collimators with a working distance at or close to zero. Based on this working distance, the focal length of the collimators was selected to produce diffractive widening of the Gaussian beam between consecutive filters which was compensated for by the curvature of the filters. The latter characteristic implies a solution that is optimized by orienting the filters to present a negative curvature to the Gaussian beam segments propagating between the filters. Effects that influence the optimum focal length of the collimator may include a wavelength dependence of the working distance of the collimator, as well as the working distance and position of the collimators of the common and upgrade ports.

The refractive indices of the optical fiber and collimation lens typically depend on the wavelength of the light. Thus, the mode field diameter of the fiber and the focal length of the collimator may be different at different wavelengths. These two effects may partially cancel out. Nevertheless, it may only be possible to optimize the focal length and working distance of the collimator of the common port for a single wavelength. While achromatic collimators may be possible, this would add to the cost of the WDM device. Thus, a small wavelength dependent mismatch may be tolerated in any wavelength division multiplexing design that uses simple collimator lenses. Stated another way, the effect of the wavelength dependence is typically less than the effect of component tolerances, and can thus be tolerated.

Figure 1:
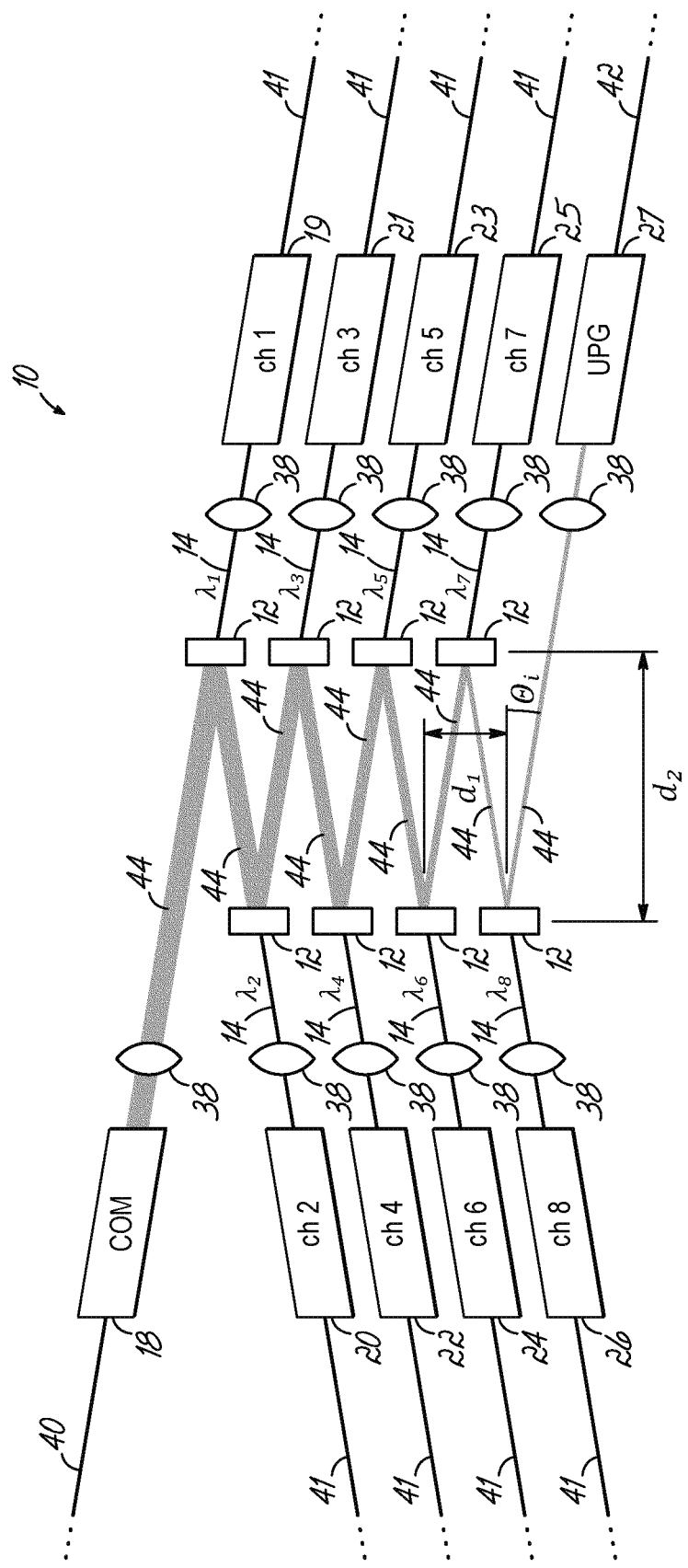
FIG. 1 is a schematic view of an exemplary multiplexer including an arrangement of bandpass filters as known in the art.

Using the component positioning of FIG. 1 with a single type of collimator may introduce an error or offset at the initial filter in the optical sequence of filters as the beam waist for this segment of the Gaussian beam may be located at the collimator of the common port rather than half-way between the two rows of filters. The same issue may arise for the collimator of the upgrade port. For a collimator with a working distance equal to zero, the beam waist is normally located at the collimator. One difference between the common and upgrade ports and the channel ports is that all channel ports typically have a filter in front of them which interacts with the beam. In contrast, the common and upgrade ports typically do not have a filter. Thus, the common and upgrade ports may optimally be configured to have different working distances than the channel ports.

This offset may be corrected by adjusting the position of the common and upgrade port collimators as depicted in FIG. 2, in which the common and upgrade ports 18, 27 have been moved closer to their respective optically adjacent filters 12 as compared to the baseline multiplexing device. The distance between the common and upgrade ports 18, 27 and their respective optically adjacent filters 12 may thereby be set so that the beam waist is located in the optimum position. Alternatively, the focal lengths and working distance of the collimators of the common and upgrade ports may be optimized for the arrangement shown in FIG. 1. That is, the working distance of the common and upgrade port collimators may be chosen so that the beam waists are located at the collimators, and the focal lengths chosen so that the beam diameters on the initial and final filters would match the beam diameters on the other filters. In this case, the collimators for the common and upgrade ports would have different specifications than the collimators for the channel ports. In any case, it should be understood that the distances depicted are for illustrative purposes only, and do not necessarily accurately reflect the actual differences between the distances in question.

Figure 15:
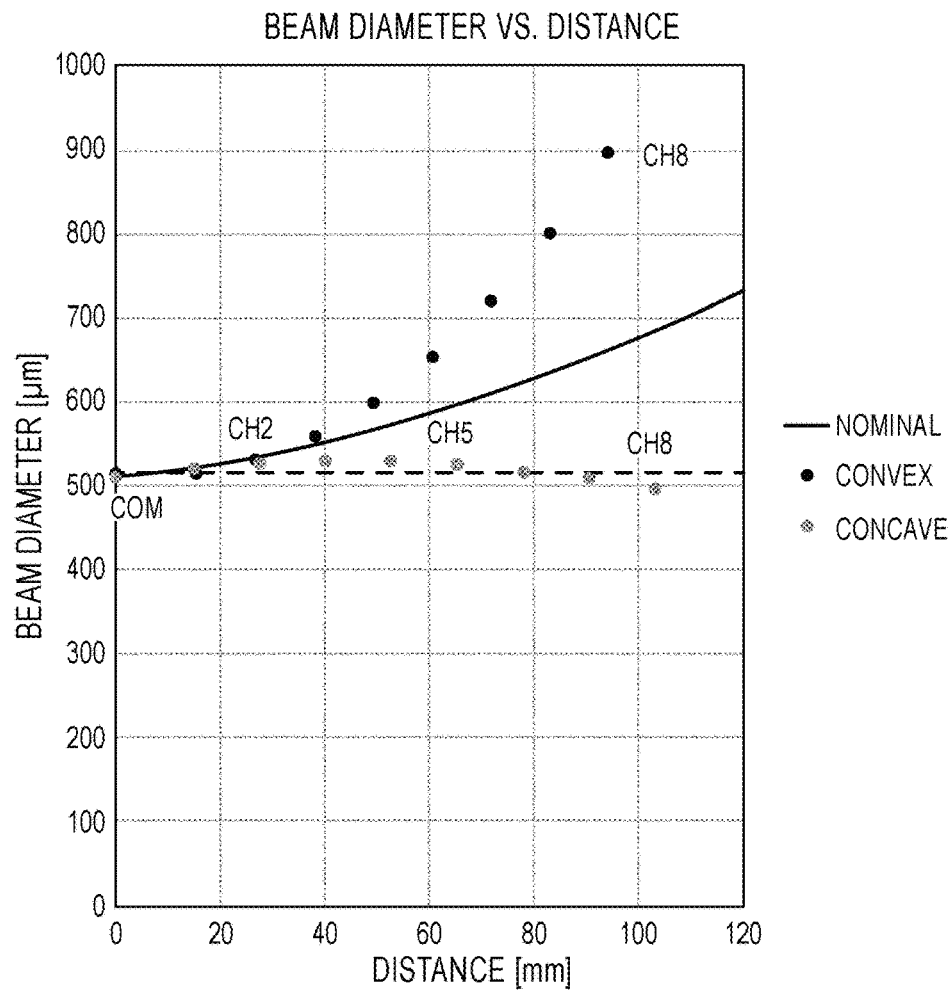
FIG. 15 is a graphical view showing beam diameter versus distance for the test multiplexer with a common port including collimators having improved focal lengths and working distances equal to zero, and bandpass filters oriented in the convex and concave orientations.

FIG. 15 depicts a graph with datapoints showing simulated beam diameter vs distance for the test module with common and upgrade ports having collimators with improved focal lengths and working distances equal to zero, and the filters in the convex and concave orientations. A plot shows a nominal case in which the effects of the filter curvature are ignored. It can be seen that the mirrors in convex orientation increase the beam diameter substantially while the beam diameter remains relatively constant for the concave orientation.

Figure 16:
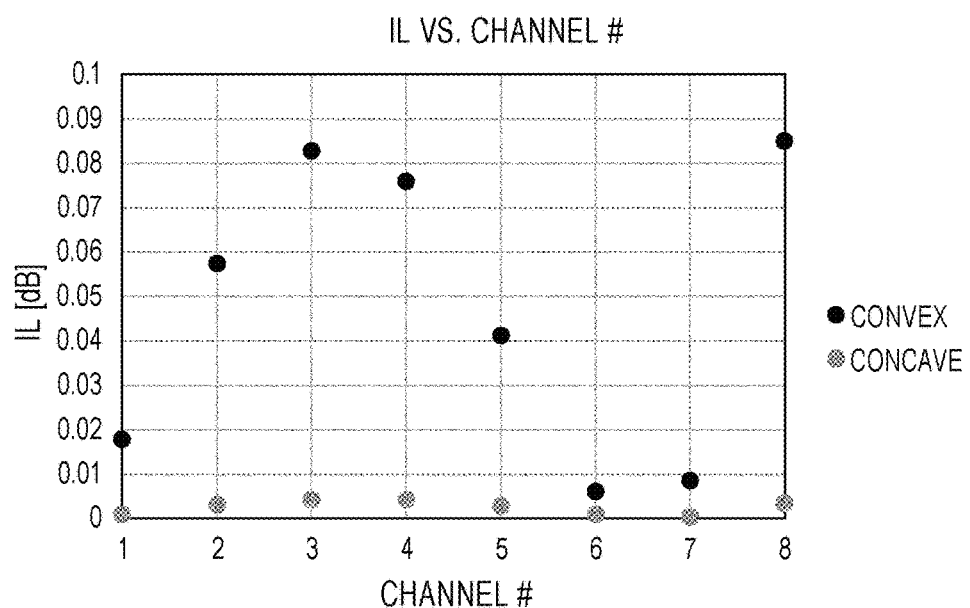
FIG. 16 is a graphical view showing optical path insertion loss resulting from the beam diameters of FIG. 15.

FIG. 16 depicts a graph with datapoints showing simulated insertion loss of the test module for each channel for the convex and concave filter orientations of FIG. 15. The concave orientation provides noticeably less insertion loss, even the worst channel has an insertion loss of less than 0.01 dB. Thus, insertion losses are significantly reduced in both configurations as compared to the baseline results depicted by FIGS. 13 and 14. An optimum collimator configuration cannot be found for collimators having a working distance of zero for the convex orientation, and losses increase quickly beyond 2 dB.

While the effect of a non-optimal position of the beam waists associated with the common and upgrade ports is noticeable, FIGS. 15 and 16 indicate the increase in insertion loss is negligible compared to other effects. Simulations have also indicated that the spectral characteristics are negligible compared to other effects. Accordingly, the improved simplicity and uniformity of assembly for the arrangement depicted in FIG. 2 and reduction of the bill of materials from using the same collimators throughout the WDM device may outweigh the disadvantages.

Monte Carlo simulations were also performed to optimize compact dense wavelength division multiplexing modules having 8, 12, and 24-channels in a two-layer configuration. In the two-layer configuration, a prism was inserted into the optical beam to fold the optical path up and back into a second layer. This provides an advantage that the length of the module is reduced at the expense of the height. Additionally, all collimators and fibers point in the same direction and enter the housing on the same side, which reduces the space required for fiber routing, simplifies fiber management, and allows the module to be placed against a wall. The dimensions for each module are summarized in Table I, and all dimensions are in millimeters (mm).

TABLE I

Summary of Dimensions

| Channels | 8 | 12 | 24 |
|---|---|---|---|
| Length (L) | 37 | 38 | 39 |
| Width (W) | 13 | 18 | 33 |
| Height (H) | 4 | 4 | 4 |

Figure 17A:
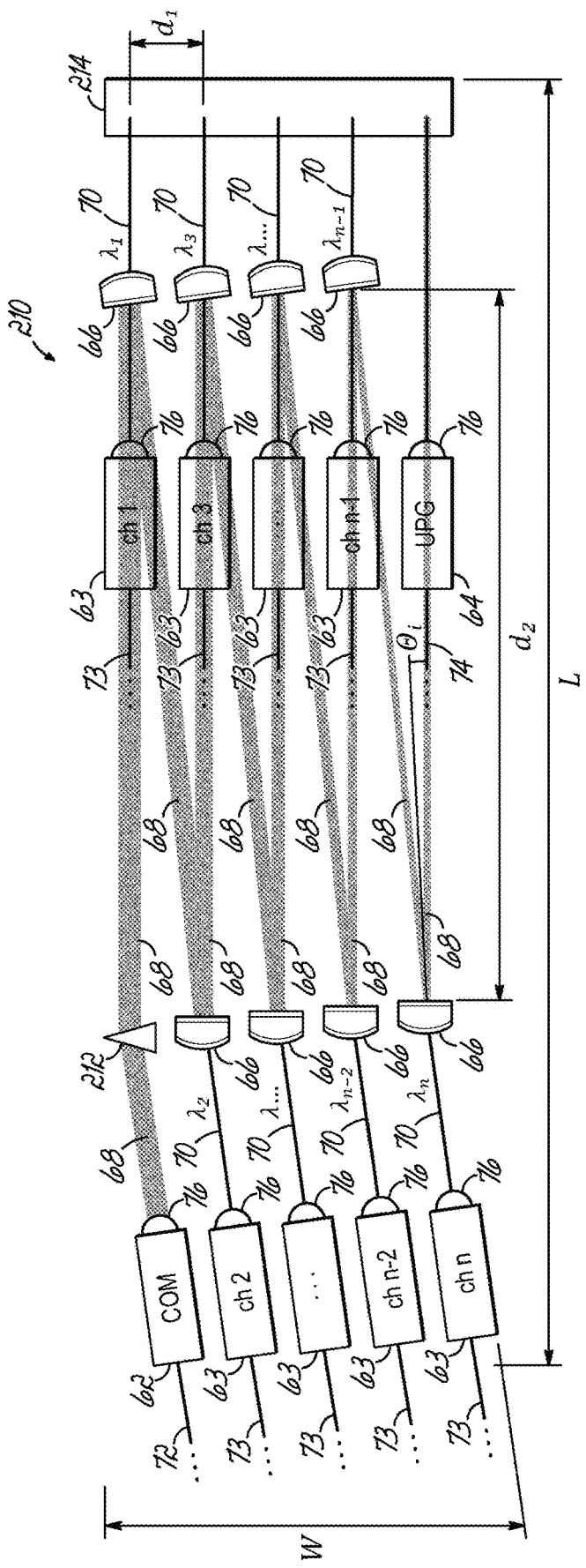
FIGS. 17A and 17B are schematic views of an n-channel test multiplexing device.
Figure 17B:
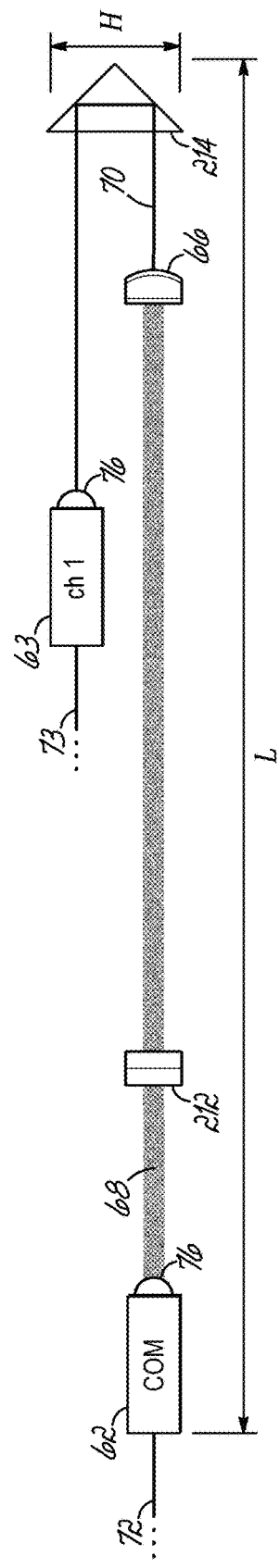

FIGS. 17A and 17B depict an exemplary test WDM device 210 having n-channels, and in which like reference numerals refer to like features depicted in FIG. 2. The test WDM device 210 includes a common port 62, a plurality of channel ports 63, an upgrade port 64, a plurality of bandpass filters 66, a common port prism 212, and a beam folding prism 214. The common port prism 212 may be configured to receive the optical beam 68 from the collimator 76 of common port 62, and refract the optical beam 68 toward the filter 66 associated with the channel one channel port 63 of WDM device 210. The beam folding prism 214 may be in the optical path between the odd channel ports 63 and their corresponding filters 66. The beam folding prism 214 may reflect the optical signal 70 received from each filter 66 upward and back toward the filter's respective channel port 63, and reflect each optical signal 70 received from the respective channel port 63 downward and back toward the filter 66. This folding of optical signals 70 may enable the odd-numbered channel ports 63 and upgrade port 64 to be physically offset (e.g., vertically offset) from the common port 62 and even-numbered channel ports 63.

Figure 18:
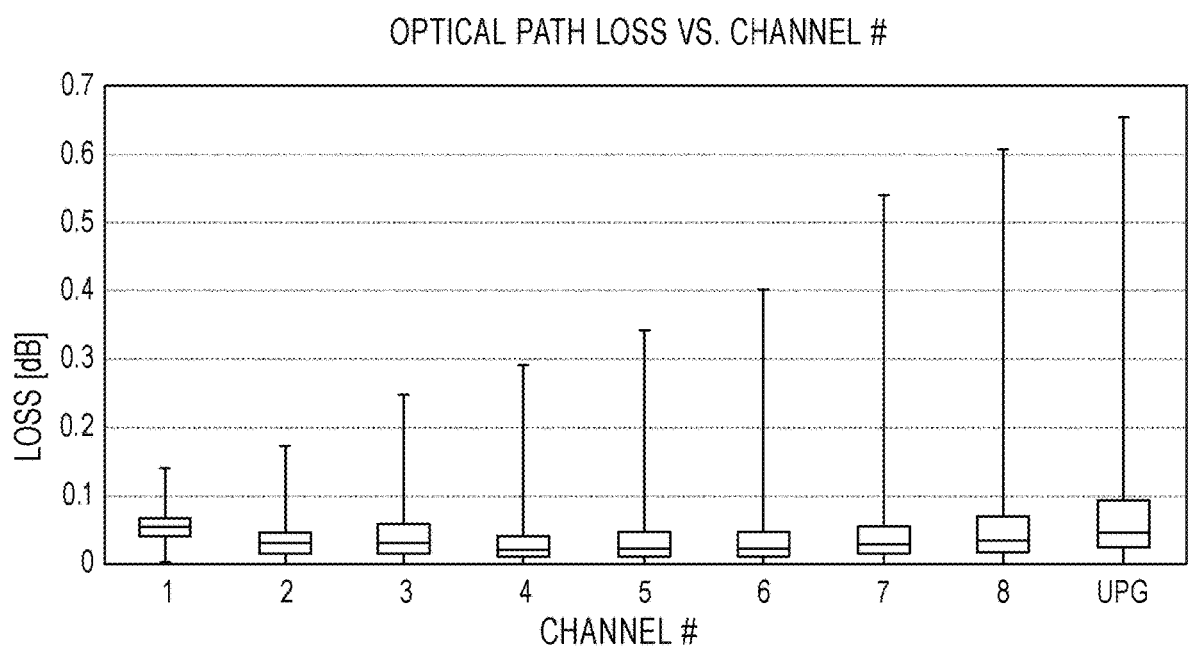
FIG. 18 is a graphical view showing optical path loss versus channel for an 8-channel embodiment of the test multiplexing device of FIGS. 17A and 17B.
Figure 19:
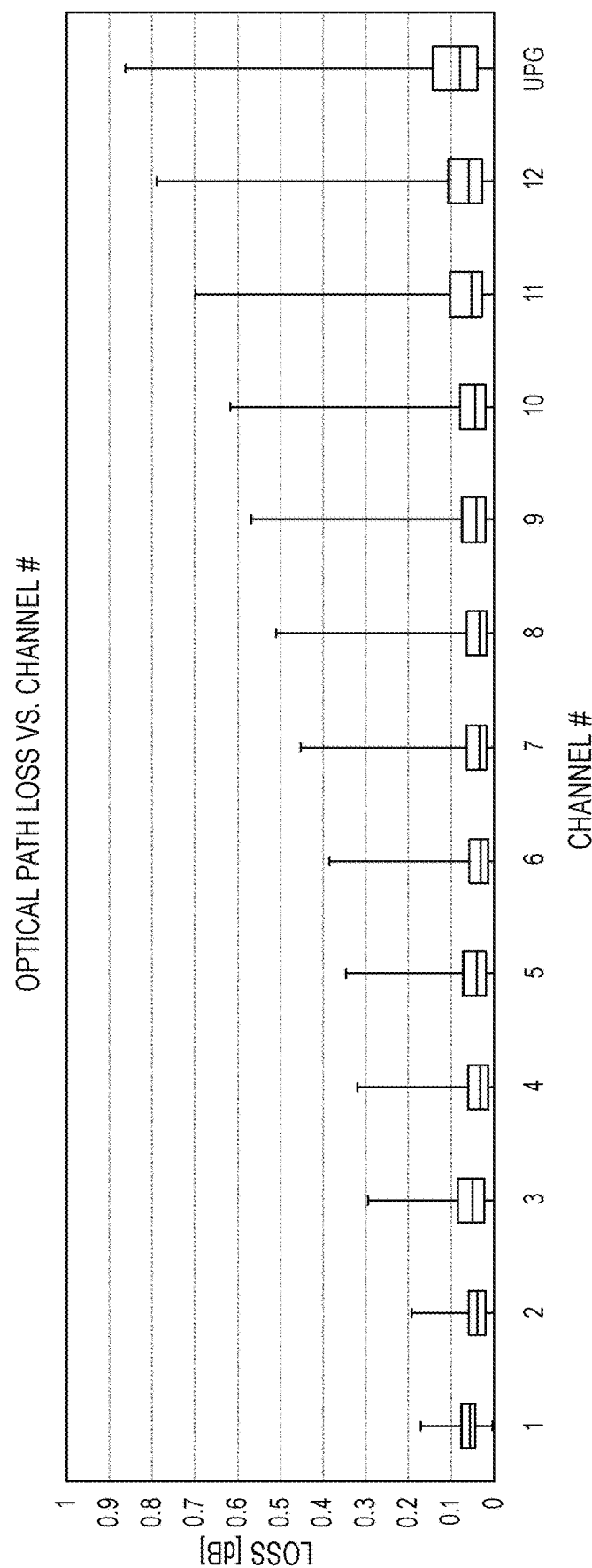
FIG. 19 is a graphical view showing optical path loss versus channel for a 12-channel embodiment of the test multiplexing device of FIGS. 17A and 17B.
Figure 20:
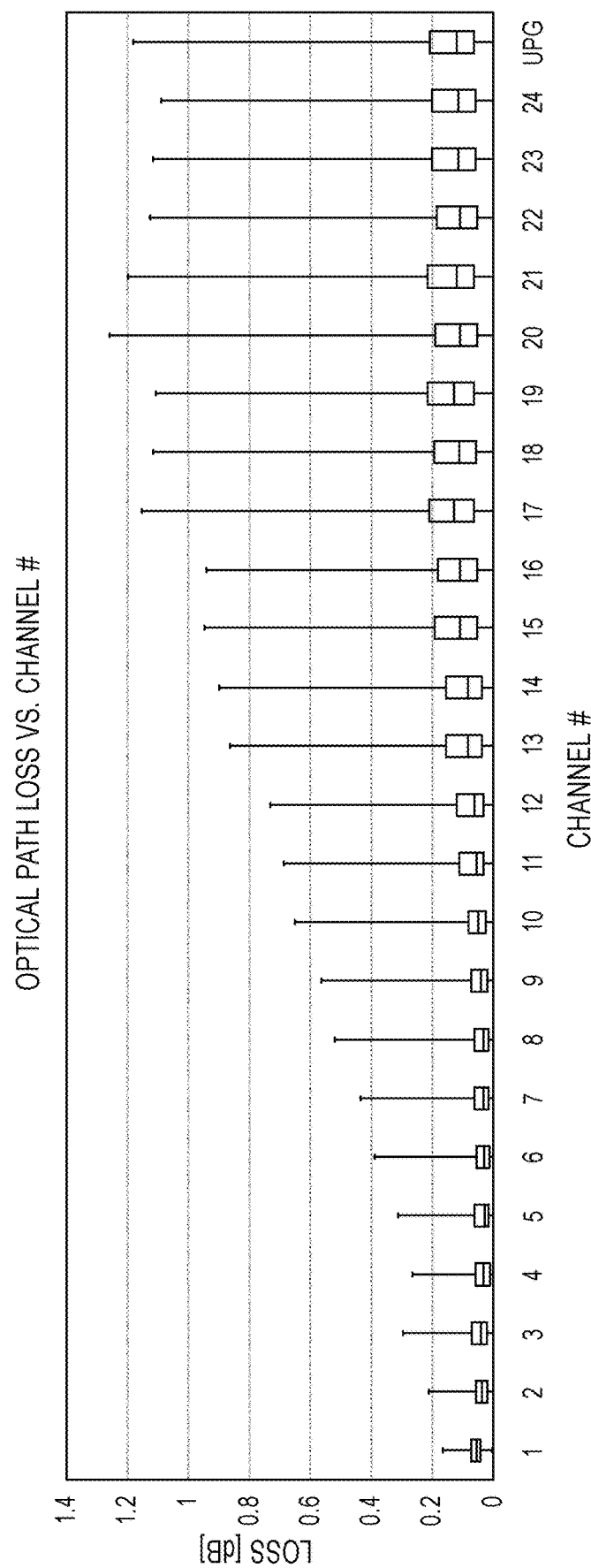
FIG. 20 is a graphical view showing optical path loss versus channel for a 24-channel embodiment of the test multiplexing device of FIGS. 17A and 17B.
Figure 21:
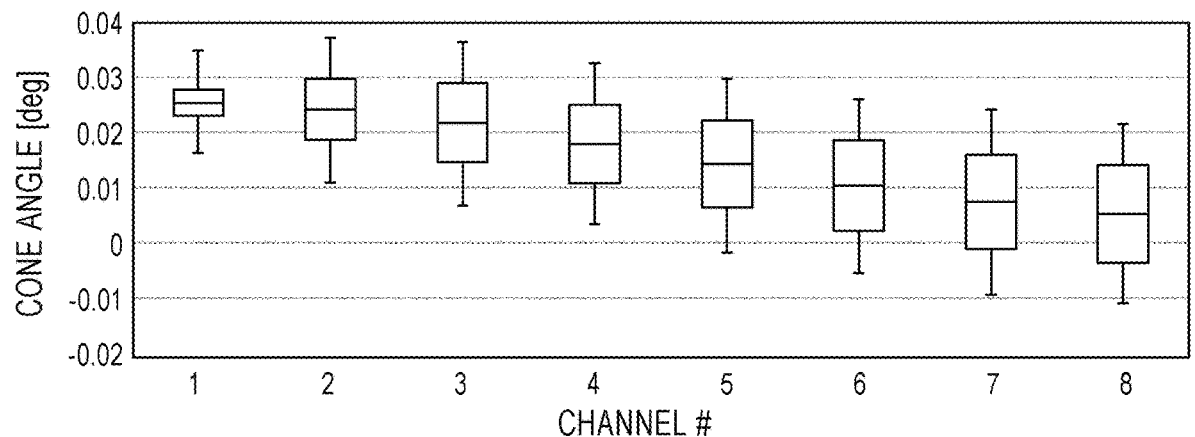
FIG. 21 is a graphical view showing cone angle versus channel for the 8-channel test multiplexer.
Figure 22:
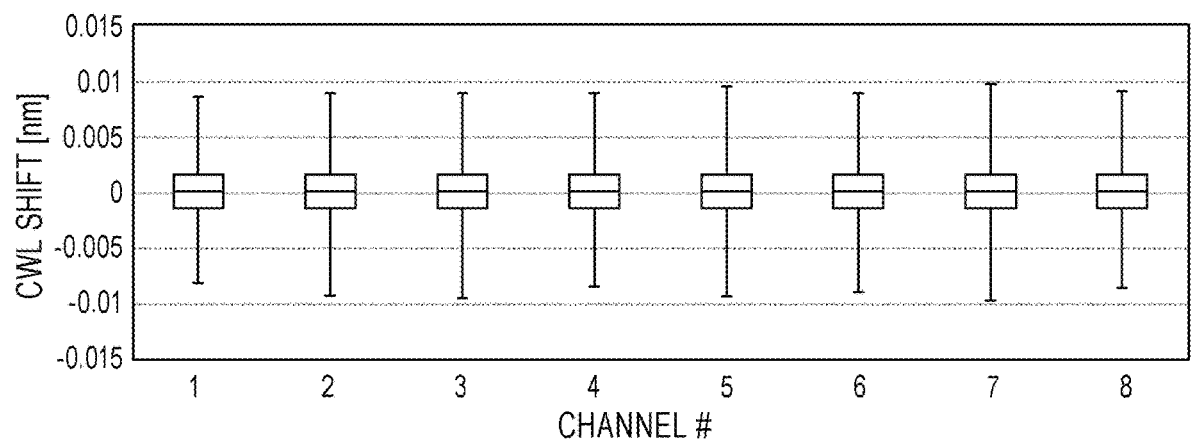
FIG. 22 is a graphical view showing filter wavelength shift versus channel for the 8-channel test multiplexing device.
Figure 23:
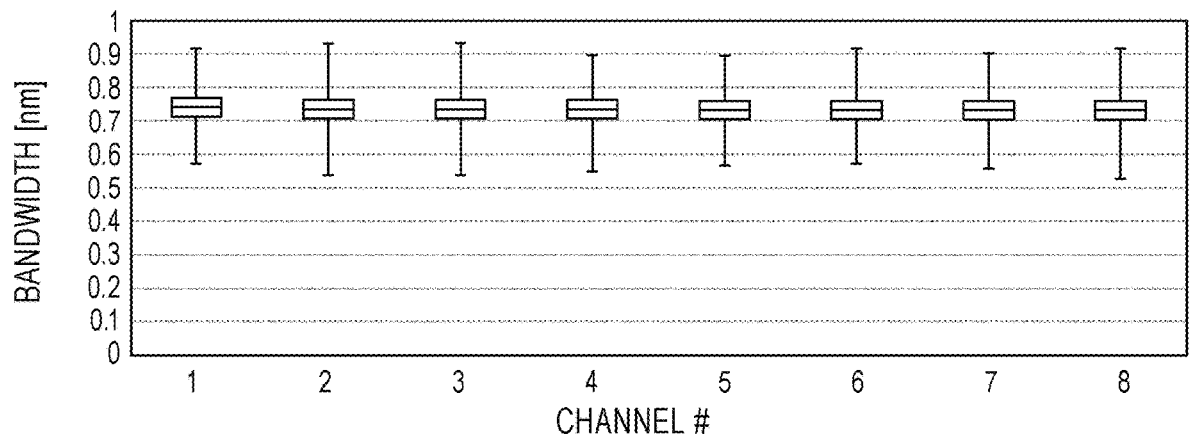
FIG. 23 is a graphical view showing filter bandwidth versus channel for the 8-channel test multiplexer.
Figure 24:
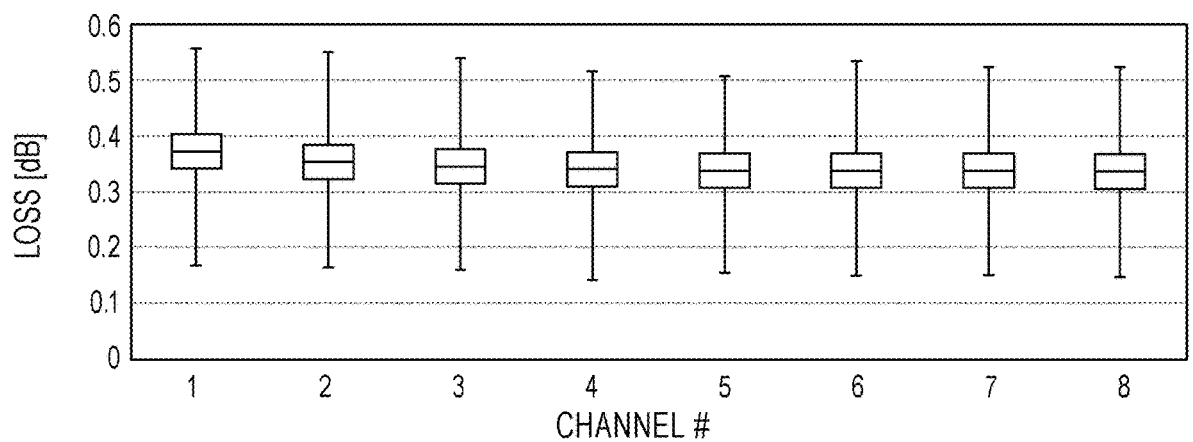
FIG. 24 is a graphical view showing transmission loss versus channel for the 8-channel test multiplexing device.

FIGS. 18-20 depict simulated optical path losses for 8, 12, and 24-channel versions of the WDM test module 210. Each of the 8, 12, and 24-channel test WDM devices 210 has an angle of incidence $\theta_I$ of 4°, a lateral distance $d_1$ of 2.5 mm, and transverse distance $d_2$ of 17.2 mm. As previously noted, the length L, width W, and height H of the 8, 12, and 24-channel test WDM devices 210 are shown in Table I above. In each of the path loss graphs, the boxes indicate the upper and lower quartiles, and lines extending from the boxes indicate variability outside the upper and lower quartiles. All WDM devices were optimized using identical collimators with working distance of zero for all channels at a wavelength of 1550 nm. The insertion loss of odd numbered channels is slightly higher as these optical paths are folded into the second layer, which introduces additional losses due to increased path length. These results demonstrate that very low insertion loss values are possible, especially for low channel numbers. The size of the whiskers shows the effect of the variability of the component parameters, e.g., filter radius of curvature or collimator working distance, and are based on realistic data. The effect of non-ideal parameters increases with channel number and levels off at about channel 17.

FIGS. 21-24 summarize the beam cone angles and the spectral characteristics for the simulated 8-channel test module. The nominal values used for the filters in the simulations are a center wavelength shift of 0 nm, a bandwidth of 0.73 nm, and insertion loss of 0.34 dB. The center wavelength shift is actively compensated during placement of the filter by adjusting the filter angle of incidence, so the observed variation may be entirely due to misalignments during the assembly process. The filter bandwidth appears to be dominated by variations in the filter material. The only appreciable effect of the beam cone angle is observable for the filter insertion loss, which is increased slightly for the first few filters where the cone angle is largest.

Figure 25:
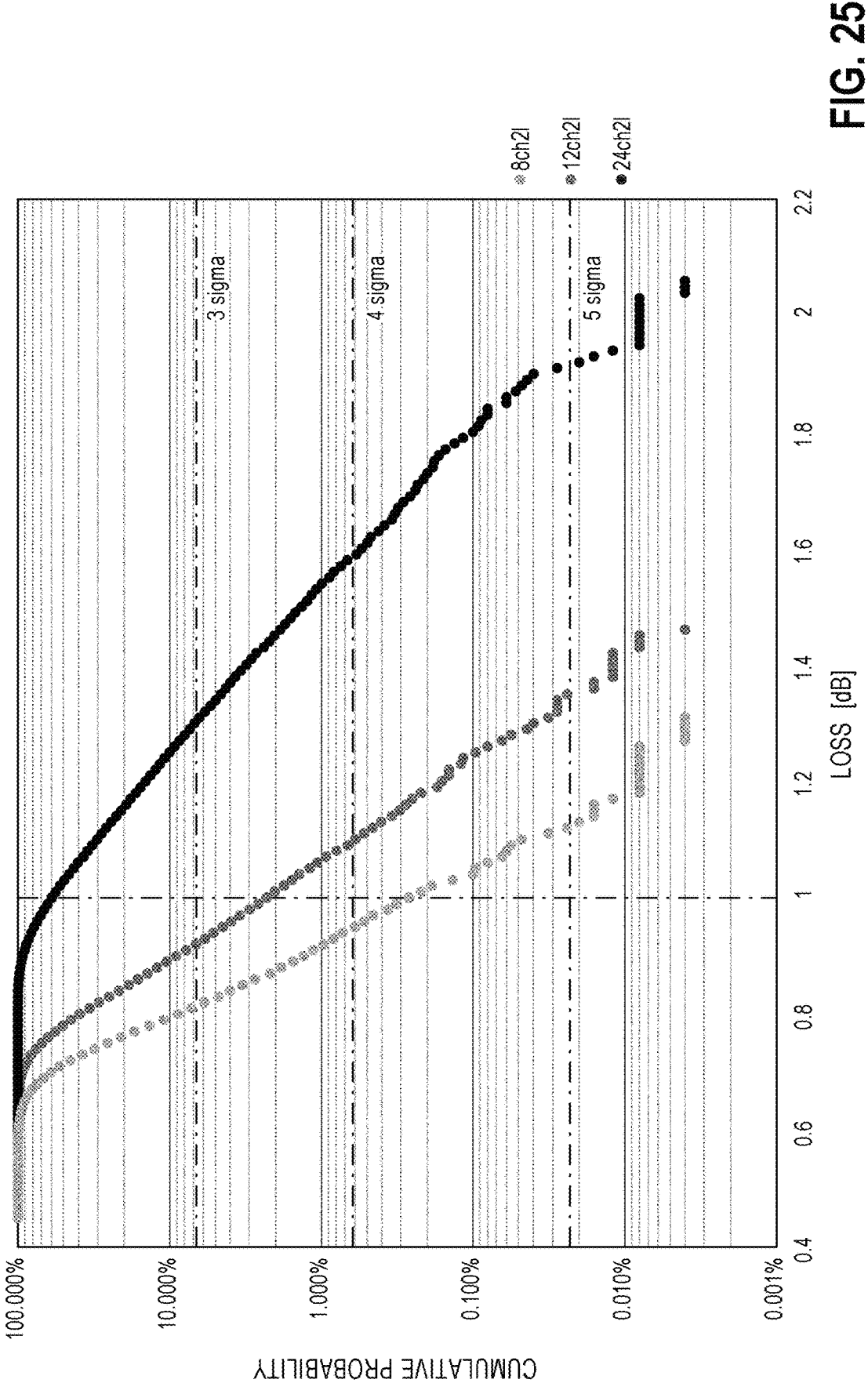
FIG. 25 is a graphical view showing cumulative probability versus path loss for the 8, 12, and 24-channel test multiplexers.

The parameters for the optimized collimators used to generate the above simulated data are summarized in Table II. All collimators differ very little, so that optimum parameters for a collimator may be found that work for all modules with only a minimum of excess loss for each module type. All simulated collimators were optimized for a wavelength of 1550 nm, and all modules included an upgrade port. As the values of the nominal value or variance of the simulation parameters (e.g., filter thickness or radius of curvature) may change, so may the exact value of the optimum collimator parameters. The collimator lens may also be optimized to eliminate the air gap, so that the fiber couples directly to the collimator lens with an object distance of zero. Other combinations of collimator lens length and airgap may also be found. FIG. 25 depicts cumulative probability plots for all modules using collimators with the parameters from Table II. Predicted yield at 1 dB insertion loss was 99.7% for the 8-channel test module, 97.7% for the 12-channel test module, and 40.3% for the 24-channel test module. Predicted insertion loss for a 95% yield was 0.83 dB for the 8-channel test module, 0.95 dB for the 12-channel test module, and 1.34 dB for the 24-channel test module.

TABLE II

Collimator Parameters

| Mux Type | Lens ROC (mm) | Lens Length (mm) | Object Distance (µm) | Working Distance (mm) | Focal Length (mm) |
|---|---|---|---|---|---|
| 8 Ch | 1.902 | 4.281 | 100 | 0 | 2.554 |
| 12 Ch | 1.851 | 4.161 | 100 | 0 | 2.485 |
| 24 Ch | 1.871 | 4.208 | 100 | 0 | 2.511 |

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The present disclosure in its broader aspects is therefore not limited to the specific details, representative apparatus and methods and illustrative examples shown and described. Accordingly, departures may be made from such details without departing from the scope of the present disclosure.

What is claimed is:

1. A wavelength division multiplexing (WDM) device, comprising:
    a common port including a common collimator configured to transmit an optical beam that includes a plurality of optical signals, wherein each optical signal of the plurality of optical signals is associated with a different wavelength range; and
    a plurality of filters that define an optical path for the optical beam, wherein each filter of the plurality of filters includes an interface having a filter radius of curvature,
    wherein a first filter of the plurality of filters is configured to receive the optical beam, transmit one of the plurality of optical signals through the interface, and reflect a remaining portion of the optical beam from the interface toward a second filter of the plurality of filters, wherein the common collimator and the first filter are configured so that the remaining portion of the optical beam reflected by the first filter has:
  a beam waist located in the optical path midway between the first filter and the second filter, and
  a wavefront radius of curvature at the second filter that matches the filter radius of curvature of the second filter,
wherein the first filter is spaced from the second filter by a filter separation optical distance measured along the optical path, and
wherein either:
  the common collimator has a working distance equal to zero and is located in the optical path at a common collimator optical distance from the first filter that is equal to half the filter separation optical distance, or
  the common collimator has a working distance equal to half the filter separation optical distance and is located in the optical path at a common collimator optical distance from the first filter that is equal to the filter separation optical distance.

2. The WDM device of claim 1, wherein the interface of each filter of the plurality of filters includes a concave side, and the filter is oriented so that the concave side faces the optical path.

3. The WDM device of claim 1, further comprising:
a plurality of channel ports, wherein each channel port is associated with a respective filter of the plurality of filters and includes a respective channel collimator.

4. The WDM device of claim 3, wherein the common collimator and each channel collimator of the plurality of channel collimators includes a respective collimating lens, and each collimating lens has the same focal length.

5. The WDM device of claim 3, wherein:
each channel port of the plurality of channel ports includes an optical fiber having an end face and a mode field diameter, and
each respective channel collimator includes a collimating lens configured to receive the optical signal transmitted by the respective filter, and to transmit the optical signal to the optical fiber so that the beam waist of the optical signal provided to the optical fiber is located at the end face of the optical fiber and has a waist diameter that is matched to the mode field diameter.

6. The WDM device of claim 1, wherein:
the optical beam includes at least four different optical signals each associated with a respective wavelength range; and
the plurality of filters includes at least four filters each configured to transmit one of the at least four different optical signals through the interface of the filter and reflect from the interface any other of the at least four different optical signals as the remaining portion of the optical beam.

7. A method of processing light in a wavelength division multiplexing device, comprising:
transmitting, by a common collimator of a common port, an optical beam including a plurality of optical signals, wherein each optical signal of the plurality of optical signals is associated with a different wavelength range;
receiving the optical beam at a first filter of a plurality of filters, wherein the plurality of filters defines an optical path for the optical beam, and each filter of the plurality of filters includes an interface having a filter radius of curvature;
transmitting one of the plurality of optical signals through the interface of the first filter;
reflecting a remaining portion of the optical beam from the interface of the first filter toward a second filter of the plurality of filters;
wherein transmitting the optical beam by the common collimator and reflecting the remaining portion of the optical beam by the first filter cause the remaining portion of the optical beam to have:
  a beam waist located in the optical path midway between the first filter and the second filter, and
  a wavefront radius of curvature at the second filter that matches the filter radius of curvature of the second filter;
wherein the first filter is spaced from the second filter by a filter separation optical distance measured along the optical path, and
wherein either:
  the common collimator has a working distance equal to zero and is located in the optical path at a common collimator optical distance from the first filter that is equal to half the filter separation optical distance, or
  the common collimator has a working distance equal to half the filter separation optical distance and is located in the optical path at a common collimator optical distance from the first filter that is equal to the filter separation optical distance.

8. The method of claim 7, wherein the interface of each filter of the plurality of filters includes a concave side, the filter is oriented so that the concave side faces the optical path, and reflecting the remaining portion of the optical beam from the interface of the first filter toward the second filter of the plurality of filters comprises:
focusing the remaining portion of the optical beam by an amount sufficient to locate the beam waist in the optical path midway between the first filter and the second filter.

9. The method of claim 7, wherein each filter of the plurality of filters is associated with a respective channel port of a plurality of channel ports, each channel port includes a channel collimator and an optical fiber, each optical fiber includes an end face and a mode field diameter, and further comprising:
receiving, by each channel collimator, the optical signal transmitted through the interface of the filter associated with the respective channel port; and
focusing, by each channel collimator, the received optical signal by an amount sufficient to locate the beam waist at the end face of the optical fiber and so that the beam waist has a waist diameter matched to the mode field diameter.

10. The method of claim 9, wherein each channel collimator applies the same amount of focusing to the received optical signal.

11. The method of claim 7, wherein the optical beam includes at least four different optical signals each associated with a respective wavelength range, the plurality of filters includes at least four filters, and further comprising:
transmitting, by each of the at least four filters, a respective one of the at least four different optical signals through the interface of the respective filter; and
reflecting, by each of the at least four filters, any of the at least four different optical signals other than the transmitted optical signal as the remaining portion of the optical beam.

* * * * *